United States Patent [19]

Tanaka et al.

[11] Patent Number: 4,603,602
[45] Date of Patent: Aug. 5, 1986

[54] METHOD OF CONTROLLING CONTINUOUSLY VARIABLE TRANSMISSION

[75] Inventors: Yoshikazu Tanaka; Haruyoshi Kumura, both of Yokohama; Keiju Abo; Hiroyuki Hirano, both of Yokosuka; Sigeaki Yamamuro, Zushi, all of Japan

[73] Assignee: Nissan Motor Company, Limited, Yokohama, Japan

[21] Appl. No.: 560,940

[22] Filed: Dec. 13, 1983

[30] Foreign Application Priority Data

Dec. 17, 1982 [JP] Japan .................... 57-220089

[51] Int. Cl.⁴ .................... B60K 41/12; B60K 41/18
[52] U.S. Cl. .................... 74/866; 74/860
[58] Field of Search .................... 74/866, 865, 867, 860

[56] References Cited

U.S. PATENT DOCUMENTS

| | | | |
|---|---|---|---|
| 3,202,012 | 8/1965 | Jania | 74/885 X |
| 3,890,360 | 6/1975 | Pruvot et al. | 74/860 X |
| 4,428,257 | 1/1984 | Meyerle et al. | 74/866 |
| 4,464,952 | 8/1984 | Stubbs | 74/866 X |
| 4,470,117 | 9/1984 | Miki et al. | 74/866 X |
| 4,475,416 | 10/1984 | Underwood | 74/868 |
| 4,481,844 | 11/1984 | Ironside et al. | 74/860 |
| 4,507,986 | 4/1985 | Okamura et al. | 74/866 |
| 4,509,125 | 4/1985 | Fattic et al. | 74/866 X |

FOREIGN PATENT DOCUMENTS

| | | | |
|---|---|---|---|
| 0109569 | 8/1979 | Japan | 74/867 |
| 57-16134 | 6/1982 | Japan | |
| 0161347 | 10/1982 | Japan | 74/865 |
| 1556888 | 11/1979 | United Kingdom | 74/866 |

OTHER PUBLICATIONS

"Experiments with Electronic Control Applied to a Moped Automatic Transmission", Leotta, Second International Conference on Automotive Electronics, London, England 29 Oct.-2 Nov. 1979, 120-4.

U.S. application Ser. No. 362,489 by Yamamuro et al., entitled "Method and Apparatus for Controlling . . ." filed 3/26/82.

Primary Examiner—Kenneth J. Dorner
Assistant Examiner—Dirk Wright
Attorney, Agent, or Firm—Schwartz, Jeffery, Schwaab, Mack, Blumenthal & Evans

[57] ABSTRACT

The method features in that the speed at which a shift actuator operates in effecting an upshifting is slower than the speed at which the shift actuator operates in effecting a downshifting.

7 Claims, 29 Drawing Figures

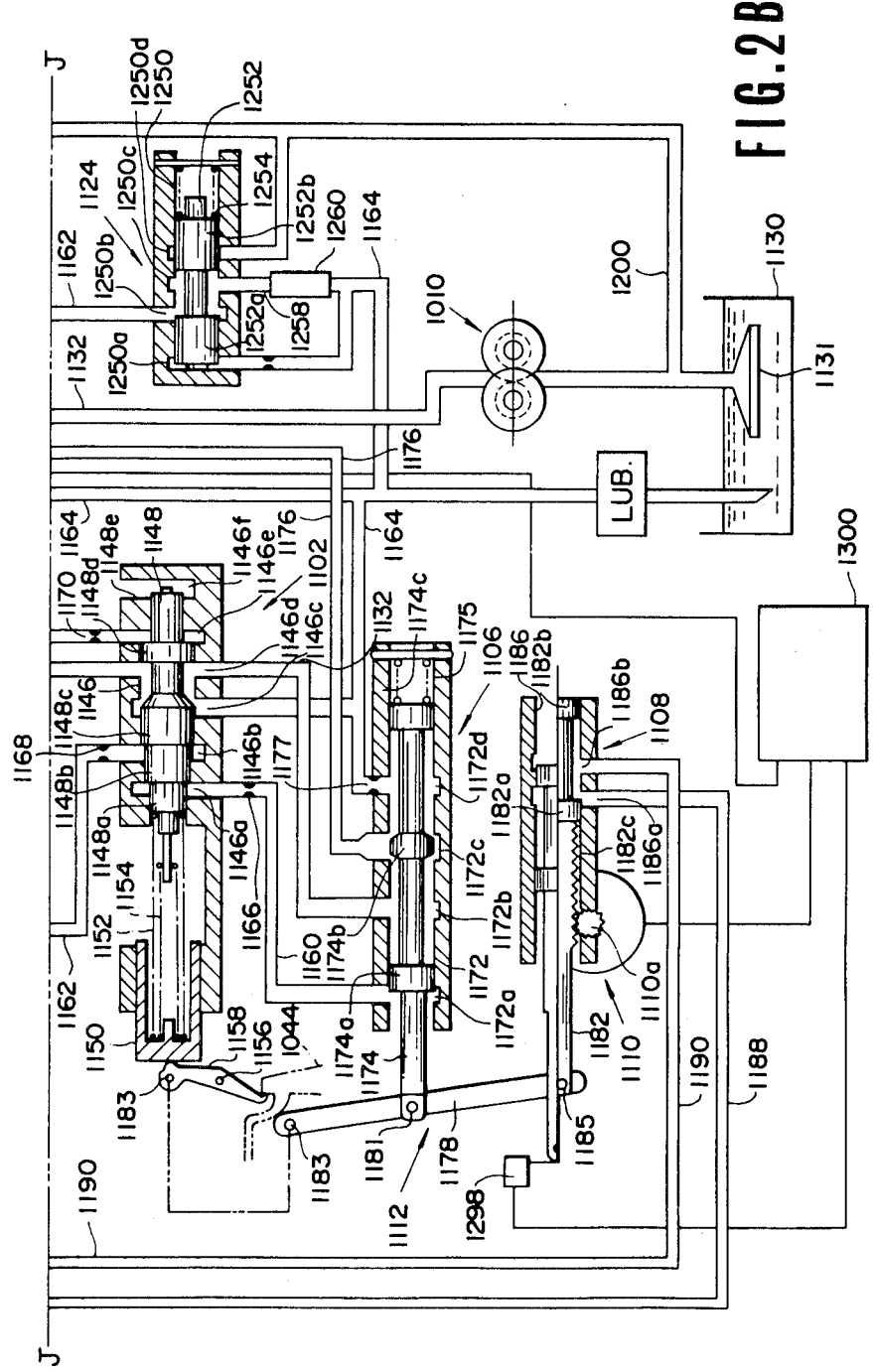

TO STEP 601 OF FIG. 5(a)

FIG.11

|  | | 0 | ΔV' | 2ΔV' | → VEHICLE SPEED |
|---|---|---|---|---|---|
|  | | k1 | k1+Δk | k1+2Δk | → ADDRESS |
| 0 | j1 | PULSE NUMBER DATA ND | | | |
| ΔTH' | j1+Δj | | | | |
| 2ΔTH' | j1+2Δj | | | | |
| ↓ THROTTLE OPENING DEGREE | ↓ ADDRESS | | | | |

FIG.12

|  | A | B | C | D |
|---|---|---|---|---|
| 317 a | H | L | L | H |
| 317 c | H | H | L | L |
| 317 b | L | H | H | L |
| 317 d | L | L | H | H |

⟶ UPSHIFT
⟵ DOWNSHIFT

← UPSHIFT
→ DOWNSHIFT

METHOD OF CONTROLLING CONTINUOUSLY VARIABLE TRANSMISSION

CROSS-REFERENCES TO RELATED APPLICATIONS

Reference is made to the following related copending application, filed by the same applicants as those of the present application; U.S. patent application Ser. No. 489,600 filed on Apr. 28, 1983. References are also made to the following related copending applications, each filed by the same applicants concurrently on Oct. 20, 1983; U.S. patent application Ser. No. 543,838; U.S. patent application Ser. No. 544,071; U.S. patent application Ser. No. 543,839; U.S. patent application Ser. No. 544,066; and U.S. patent application Ser. No. 543,840.

BACKGROUND OF THE INVENTION

The present invention relates to a method of controlling a continuously variable transmission.

In a known method of controlling a continuously variable transmission which is disclosed in Tokkai Sho. 57-161346 which has a corresponding U.S. patent application Ser. No. 362,489 and a corresponding European patent application No. 8210250.1, a shift command signal is obtained by retrieving a memorized shift pattern with a given throttle opening degree and a given vehicle speed, and in accordance with the shift command signal, a shift motor is controlled so as to establish a desired reduction ratio. The shift motor rotates at the same speed when operated and actuates a shift control valve in such a manner as to adjust the distribution of oil pressure between cylinder chambers of drive and driven pulleys. This means that the shift motor rotates at the same speed in effecting an upshifting toward small reduction ratio upon releasing the accelerator pedal for coasting, as the shift motor does upon depressing the accelerator pedal for acceleration.

However, this known method has the following problem. That is, the revolution speed of the shift motor is set high enough to provide a good response to downshifting upon depressing the accelerator pedal for acceleration. Thus, the shift motor rotates at the same high speed upon releasing the accelerator pedal for coasting, causing a rapid upshifting. This causes a rapid drop in the engine speed and a substantial change in engine torque. This change in torgue is transmitted to a driven shaft of a transmission, producing substantial shocks upon releasing the accelerator pedal for coasting.

SUMMARY OF THE INVENTION

According to the present invention, there is provided a method of controlling a continuously variable transmission wherein a reduction ratio is variable in response to operation of a shift actuator. The method features in that the shift actuator is operated at a slower speed in effecting an upshifting than a speed at which the shift actuator is operated in effecting a downshifting.

An object of the present invention is to improve a continuously variable transmission for an automotive vehicle having an engine with an accelerator pedal such that the occurrence of substantial shocks in effecting an upshifting upon releasing the accelerator pedal is prevented so as to provide a smooth upshifting with a good response characteristic to a downshifting upon depressing the accelerator pedal for acceleration.

BRIEF DESCRIPTION OF THE DRAWINGS

FIGS. 2A and 2B, when combined, illustrate a hydraulic control system for the continuously variable V-belt transmission;

FIG. 11 is a diagrammatic view illustrating how pulse number data ND are stored in a matrix in the ROM 314 versus throttle opening degree TH and vehicle speed V;

FIG. 12 is a chart illustrating various modes of stepper motor actuating signals applied to output leads 317a, 317c, 317b and 317d of the stepper motor 1110;

DETAILED DESCRIPTION OF THE INVENTION

Referring to FIGS. 1 through 21, a first embodiment according to the present invention is described.

Figure 1:
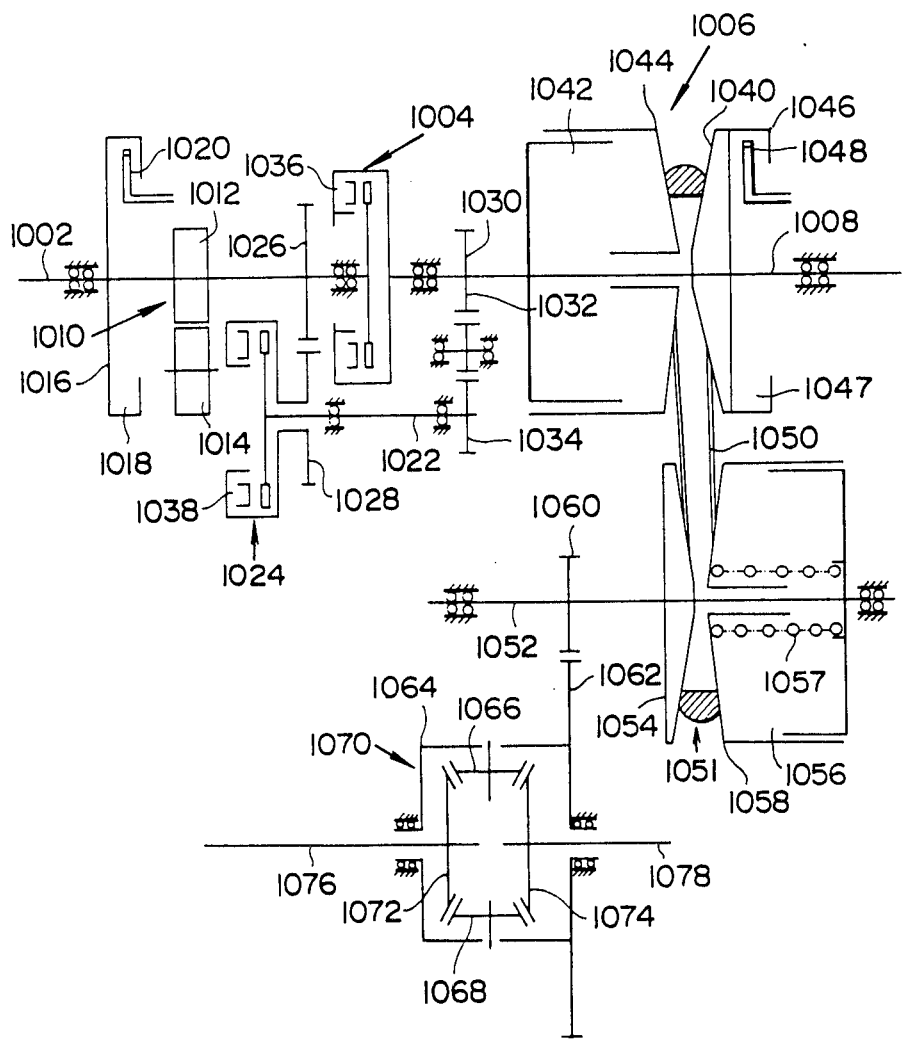
Fig. 1 is a diagrammatic view of a transmission mechanism of a continuously variable V-belt transmission.
Figure 2A:
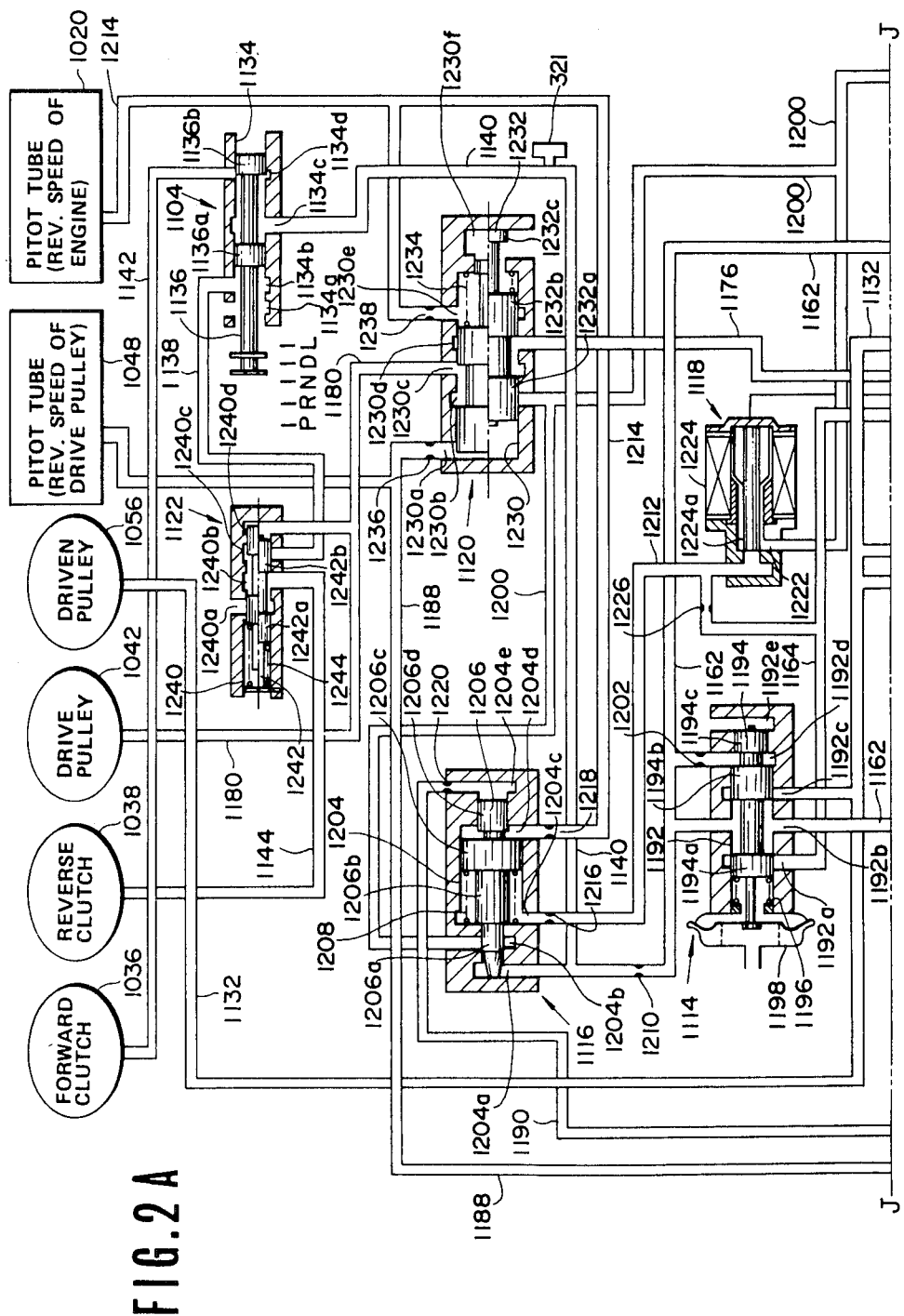

Referring to FIG. 1, a power transmission mechanism of a continuously variable V-belt transmission of an automotive vehicle is shown. Referring to FIGS. 2A and 2B, a hydraulic control system for the continuously variable V-belt transmission is shown.

The detailed description of FIG. 1 and FIGS. 2A, 2B is found in a co-pending U.S. patent application Ser. No. 489,600 filed Apr. 28, 1983 (see FIGS. 24 and 25A, 25B) by the same applicants and commonly assigned herewith. That portion of the disclosure of this co-pending application which relates to FIGS. 24, 25A and 25B is hereby incorporated by reference in its entirety.

Next, an explanation is made regarding a shift control unit or an electronic control unit 1300 which controls a shift actuator in the form of a stepper motor 1110 and a force motor 1224.

Figure 3:
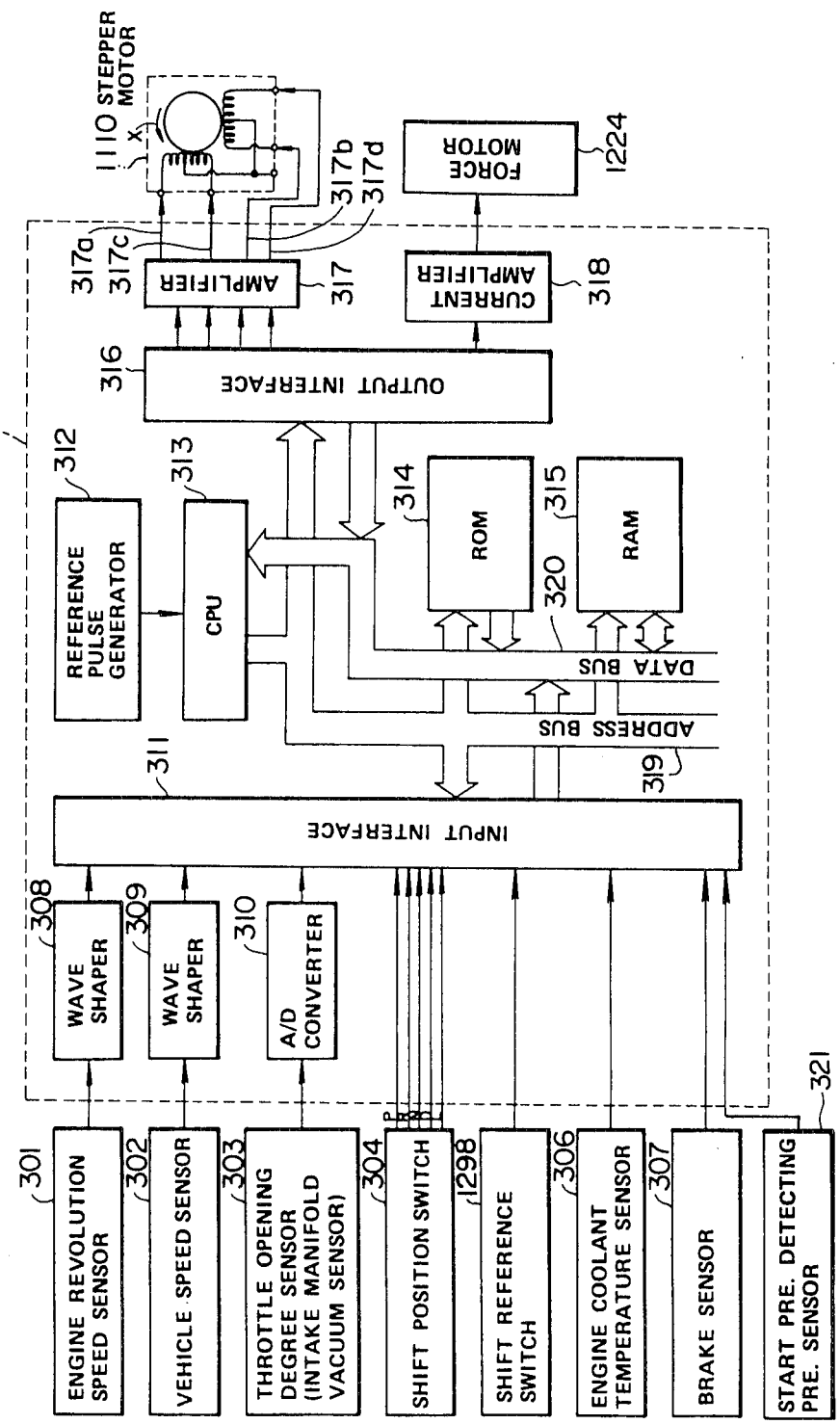
FIG. 3 is a block diagram showing an electronic control unit 1300 for controlling a shift actuator in the form of a stepper motor 1110 and a force motor 1224 shown in FIGS. 2A and 2B.

As shown in FIG. 3, the shift control unit 1300 receives as inputs thereto electric signals from an engine revolution speed sensor 301, a vehicle speed sensor 302, a throttle opening degree sensor (or an intake manifold vacuum sensor) 303, a shift position switch 304, a shift reference switch 1298, an engine coolant temperature sensor 306, a brake sensor 307, and a start pressure detecting pressure sensor 321. The engine revolution speed sensor 301 detects an engine revolution speed by measuring the number of ignition spark pulses of the engine, and the vehicle speed sensor 302 detects a vehicle speed by measuring the revolution of the output shaft of the continuously variable transmission. The throttle opening degree sensor (or intake manifold vacuum sensor) 303 detects the engine throttle opening degree in terms of an electric voltage signal (in the case of the intake manifold vacuum sensor, the intake manifold vacuum is detected in terms of an electric voltage signal). The shift position switch 304 detects which one of the range positions, namely, P, N, D, and L, the before mentioned manual valve 1104 assumes. The shift reference switch 1298 is turned on when the sleeve 1182 of the before mentioned shift operating mechanism 1108 has come to a position corresponding to the largest reduction ratio. The engine coolant temperature sensor 306 generates a signal when the engine coolant temperature is lower than a predetermined value. The brake sensor 307 detects whether or not the vehicle brake is used. The start pressure detecting pressure sensor 321 converts the start pressure in the above mentioned oil conduit 1140 into an electric signal. The signals generated by the engine revolution speed sensor 301 and vehicle speed sensor 302 are sent to an input interface 311 after passage through wave shapers 308 and 309, respectively, and the electric voltage from the throttle opening degree sensor (or intake manifold vacuum sensor) 303 is converted at an A/D converter 310 into a digital signal before being sent to the input interface 311. The electronic control unit 1300 includes the input interface 311, a reference pulse generator 312, a CPU (Central Processor Unit) 313, a ROM (Read Only Memory) 314, a RAM (Random Access Memory) 315, and an output interface 316, which are linked with each other by an address bus 319 and a data bus 320. The reference pulse generator 312 generates a reference pulse which actuates the CPU 313. The ROM 314 stores programs necessary for controlling the stepper motor 1110 and force motor 1224 and data necessary for controlling them. The RAM stores various parameters necessary for processing information from each of the sensors and switches and those necessary for control. Output signals from the shift control apparatus 1300 are sent out to the stepper motor 1110 and force motor 1224 via an amplifier 317 and an electric current amplifier 318, respectively.

Hereinafter, a concrete explanation is made regarding the content of control carried out in the control unit 1300 in controlling the stepper motor 1110 and force motor 1224.

The control may be divided into a force motor control routine 500, a complete engagement control routine 600 and a stepper motor control routine 700.

Figure 4:
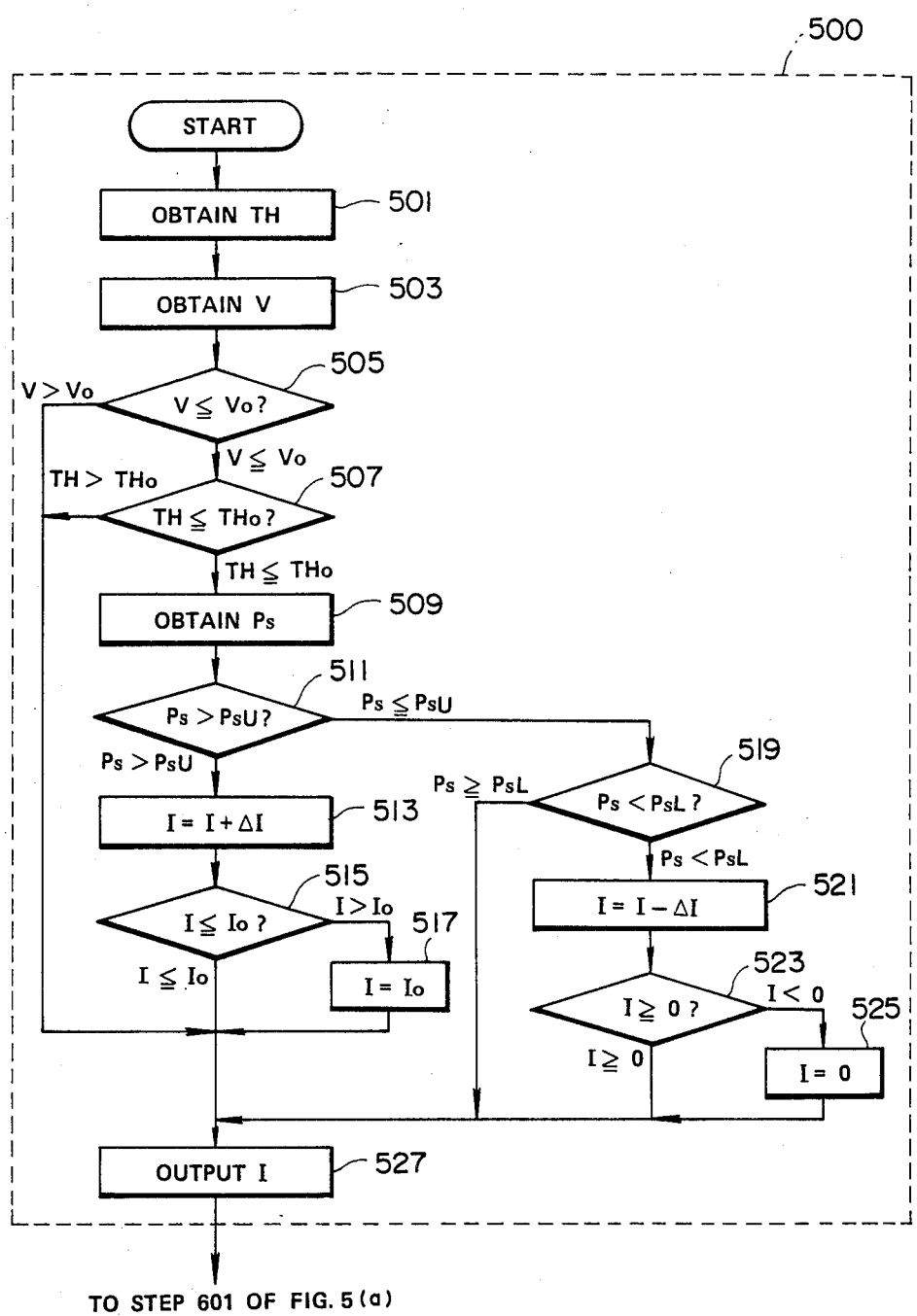
FIG. 4 is flow chart of a force motor control routine 500 of the control system.
Figure 5:
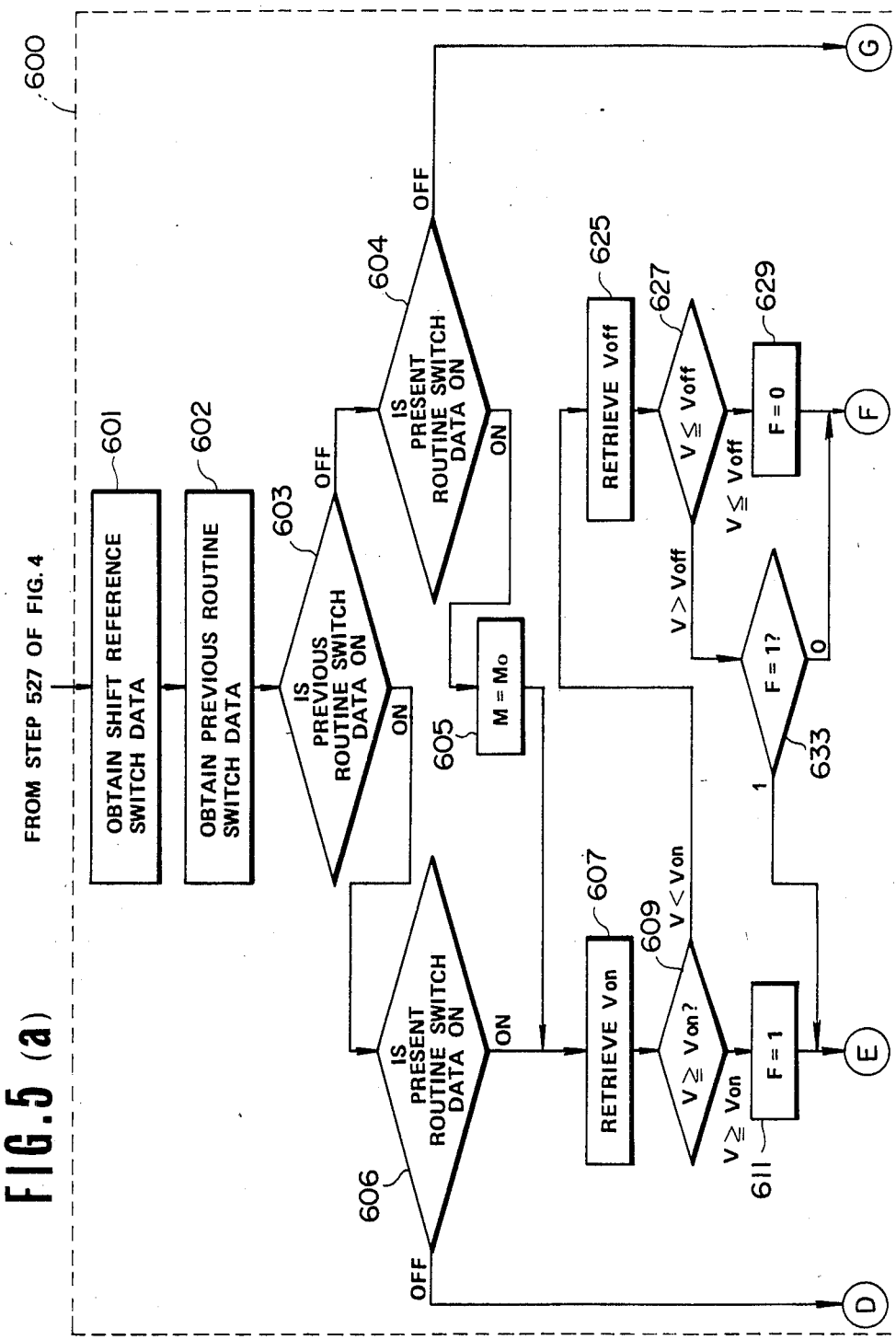
FIGS. 5(a) and 5(b), when combined, illustrate a flow chart of a complete engagement control routine 600.
Figure 5:
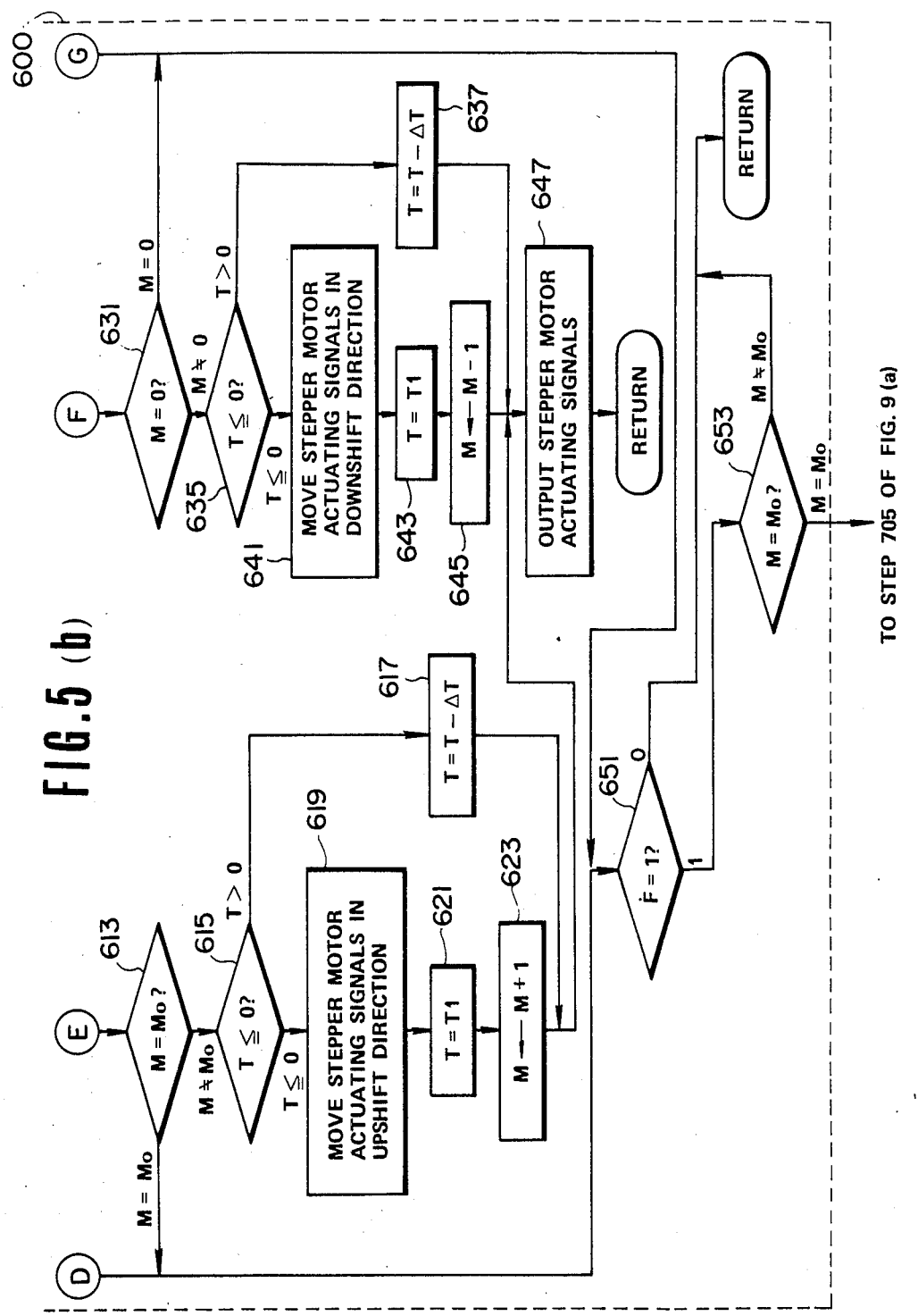

First, the control of the force motor 1224 is described. The force motor control routine 500 is shown in FIG. 4. With the force motor control routine 500, the start pressure Ps is controlled by the start adjustment valve 1118 and starting valve 1116 when the engine idles in order to put the forward clutch 1004 (or the reverse clutch 1024) in a predetermined state, such as, in a state right before initiation of the clutch engagement. This force motor control routine 500 is executed after a predetermined period of time (i.e., the execution of the following routine is repeated within a short period of time). Explaining along the steps, a throttle opening degree TH is obtained from the throttle opening degree sensor 303 (in step 501), and a vehicle speed V is obtained from the vehicle speed sensor 302 (in step 503). Then, in step 505, a determination is made whether the vehicle speed V is less than or equal to a predetermined small value Vo or not. If it is less than or equal to the predetermined value Vo, a determination is made in step 507 whether the throttle opening degree TH is less than or equal to a predetermined small value THo or not. If it is less than or equal to the predetermined value THo (i.e., in the case when the vehicle is at a standstill with the engine idling), the program goes to a step 509 wherein a start pressure Ps is obtained from the start pressure detecting pressure sensor 321. If the vehicle speed V is greater than the predetermined value Vo in step 505 or the throttle opening degree TH is greater than the predetermined value THo in step 507, the program goes to step 527 wherein the same electric current signal for the force motor 224 as that in the previous routine is sent out, i.e., the electric signal given at the instance immediately before the vehicle speed V has become greater than the predetermined value Vo or the throttle opening degree TH has become greater than the predetermined value THo. After obtaining a start pressure Ps in step 509, the program goes to a step 511 wherein a determination is made whether the start pressure Ps is greater than a desired pre-engagement start pressure upper limit value Psu. If Ps is greater than Psu, the force motor electric current signal I is increased by a predetermined small value ΔI (in step 513). Then, a determination is made whether the electric signal I is less than or equal to a maximum allowable electric signal value Io (in step 515). If I is less than or equal to Io, the program goes to the step 527, while if I is greater than Io, I is given Io (in step 517) and the program goes to the step 527. In the step 527, the force motor electric signal I is sent out. If, in step 511, Ps is less than or equal to Psu, a determination is made whether the start pressure Ps is less than a desired pre-engagement start pressure lower limit value PsL (in step 519). If Ps is greater than or equal to PsL (if combined with the determination made in the step 511, this is the case where Ps is greater than or equal to PsL but less than or equal to Psu. That is, the start pressure Ps is disposed between the upper and lower limit values.), the step 527 is executed to sent out the electric signal obtained in the previous routine. If, in step 519, Ps is less than PsL, the force motor electric signal I is decreased by the small value $\Delta I$ (in step 521). For preventing the electric signal I from becoming zero, a determination is made whether I is greater than or equal to zero or not (in step 523). If I is greater than or equal to zero, the program goes directly to the step 527, while if I is less than zero, the program goes to a step 525 where I is given zero, and then goes to the step 527. In the step 527, the electric signal I is sent out. What is done by the execution of the above mentioned steps is to increase the force motor electric signal I if the start pressure Ps is greater than the upper limit value Psu so as to decrease the start pressure Ps, or to decrease the force motor electric signal I if the start pressure Ps is less than the lower limit value PsL so as to increase the start pressure Ps. Therefore, the start pressure Ps is maintained between the upper and lower limit values Psu and PsL. The desired pre-engagement start pressure is set at a predetermined value right below a value at which the foward clutch 1004 (or the reverse clutch 1024) starts engaging. Accordingly, if the engine revolution speed increases from the idle speed, the start pressure Ps is elevated, by the action of the starting valve 1116, to a value which is the sum of the desired pre-engagement start pressure and an oil pressure corresponding to an increase in the engine revolution speed, causing engagement of the forward clutch 1004 (or the reverse clutch 1024) to start the vehicle. By virtue of the above mentioned control, stable starting operation of the vehicle is assured without the occurrence of engine racing unintentional starting of the vehicle. This is because the start pressure is controlled to become the desired pre-engagement start pressure irrespective of the variation in the idle speed which is subject to deviation from a set value due to the use of a choke or the use of an air compressor of an air conditioner or the irregular operation of the engine.

If desired, the desired pre-engagement start pressure may be set at a value at which the clutch slightly engages to transmit a small torque. As long as the torque is small, no problem is raised. If the desired pre-engagement start pressure is so set, the racing of the engine can be effectively prevented. Such setting of the desired start pressure does not create any practical problem unless an unnecessary heavy load is applied on the engine to increase its speed because the start adjustment valve 1118 prevents an unintentional starting of the vehicle.

Hereinafter, the complete engagement control routine 600 is described. The complete engagement control routine 600 is shown in FIGS. 5(a) and 5(b). The complete engagement control routine 600 is executed following the step 527 of the above mentioned force motor control routine 500. That is, the program goes from the step 527 to a step 601 wherein the data of the shift reference switch 1298 in the present routine is obtained in step 601, and then the data of the shift reference switch 1298 in the preceding routine is obtained (in step 602). Then, in step 603, a determination is made whether the shift reference switch 1298 was turned on during the preceding routine or not. If the shift reference switch 1298 was turned off in the preceding routine, a determination is made whether the shift reference switch 1298 in the present routine is turned on or not (in step 604). If it is turned on, the pulse number data M for effecting the complete engagement is given a constant pulse number Mo (in step 605) and then the program goes to a step 607. If, in the step 603, the shift reference switch 1298 in the preceding routine is turned on, a determination is made whether the shift reference switch 1298 in the present routine is turned on or not (in step 606). If it is turned on, the program goes to a step 607 wherein a complete engagement on vehicle speed Von is retrieved. The pulse number Mo indicates or corresponds to a position of the stepper motor 1110 when the shift reference switch 1298 is turned on, i.e, an instance when the rod 1182 of the shift operating mechanism 1112 has moved to the left as viewed in FIG. 2B and is about to plunge into an overstroke range. In this instance, the drive pulley revolution speed oil pressure signal begins to be admitted to the starting valve 1116 from the clutch complete engagement control valve 1108.

Figure 6:
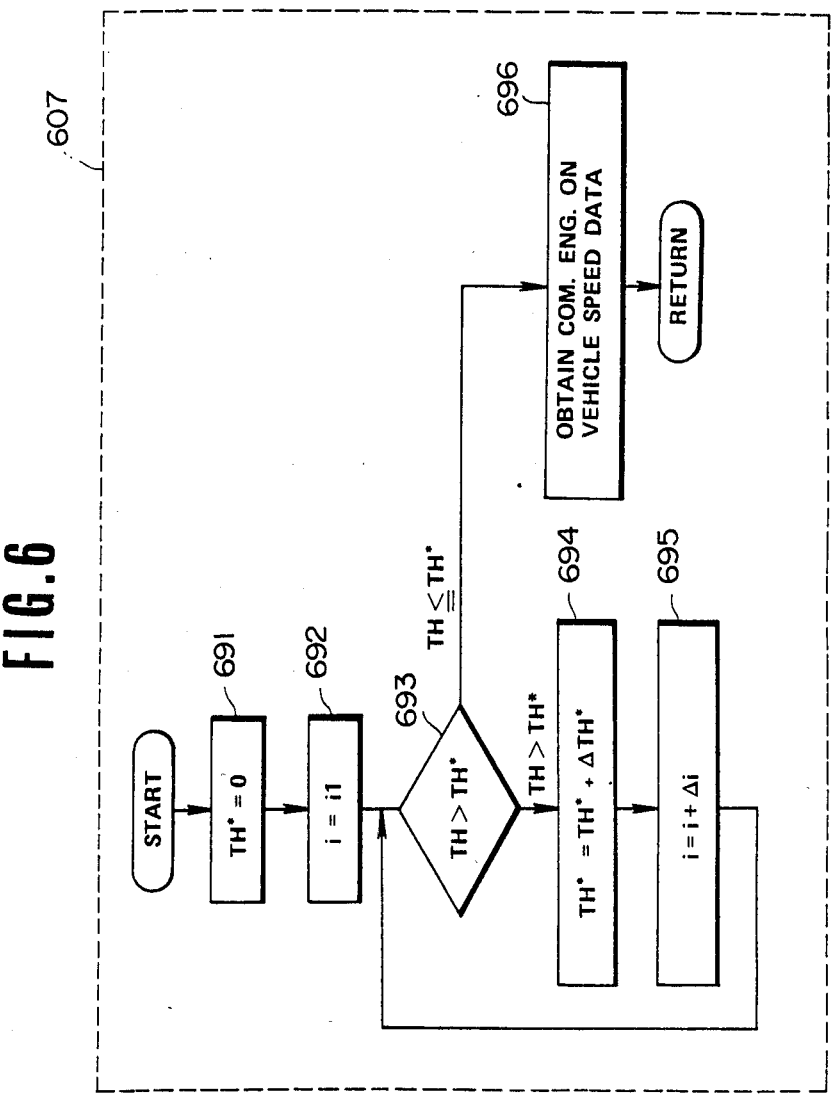
FIG. 6 is a flow chart of a data retrieval routine 607 for complete engagement on vehicle speed Von data.
Figure 7:
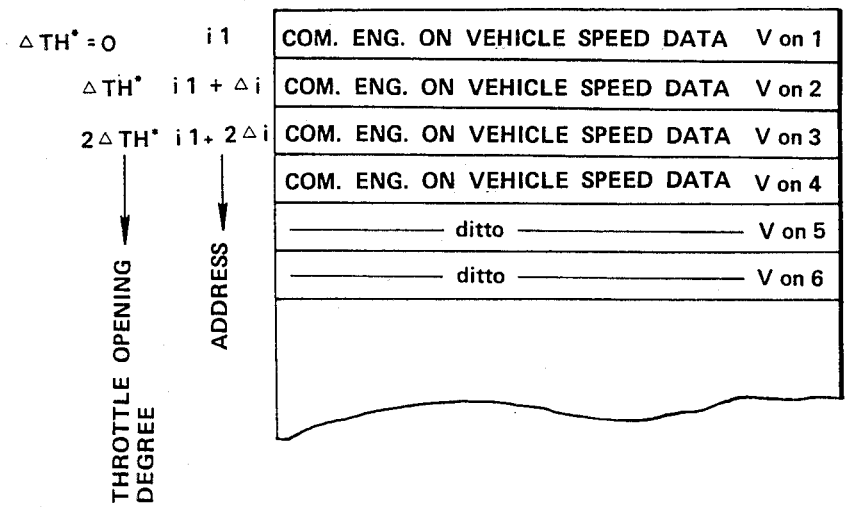
FIG. 7 is a diagrammatic view illustrating how the complete engagement on vehicle speed Von data are stored in a ROM 314 shown in FIG. 3.

The complete engagement on vehicle speed retrieval routine 607 is illustrated in detail in FIG. 6. The complete engagement on vehicle speed data Von are stored in the ROM 314 against the throttle opening degrees as shown in FIG. 7. In the complete engagement on vehicle speed retrieval routine 607, a reference throttle opening degree TH* is given zero which represents an idle state (in step 691) and then an address i for the ROM 314 is given a number i1 which corresponds to the reference throttle opening degree TH* (in step 692). Then, an actual throttle opening degree TH is compared with the reference throttle opening degree TH* (in step 693). If the actual throttle opening degree is less than or equal to the reference throttle opening degree TH*, the number i1 gives an address in the ROM 314 which stores the appropriate complete engagement on vehicle speed data Von corresponding to the actual throttle opening degree. The complete engagement on vehicle speed data Von1 is obtained from the address given by the number i1 (in step 696). On the contrary, if the actual throttle opening degree TH is greater than the reference throttle opening degree TH*, the reference throttle opening degree TH* is increased by a predetermined value $\Delta TH^*$ (in step 694), and the number i1 is increased by a predetermined value $\Delta i$ (in step 695). Thereafter, the program returns to the step 693 again where the actual throttle opening degree TH is compared with the reference throttle opening degree TH*. By repeating the flow along the steps (steps 693, 694 and 695), the number i for the address in the ROM 314 which stores an appropriate complete engagement on vehicle speed Von corresponding to the actual throttle opening degree TH is given. If TH has become less than or equal to TH*, the complete engagement on vehicle speed data Von corresponding to the address i is obtained in step 696 before returning to the START.

The complete engagement on vehicle speed Von obtained as above is compared with the actual vehicle speed V (in step 609). If the actual vehicle speed V is greater than or equal to the complete engagement on vehicle speed Von, a complete engagement flag F is given 1 in step 611, and then a determination is made whether the complete engagement pulse number data M is equal to Mo or not in step 613. If M is not equal to Mo, the program goes to step 615. In the step 615, a determination is made whether a timer value T is less than or equal to zero or not. If the timer value T is greater than zero and thus positive, the timer value T is decreased by a predetermined value $\Delta T$ (in step 617), and the same stepper motor actuating signals as in the preceding routine are sent out (in step 647) before returning to the START. The execution of the step 617 is repeated until the timer value T becomes zero or negative. When the timer value T has become zero or negative, i.e., upon elapse of a predetermined period of time, the stepper motor actuating signals are moved by one step in an upshift direction (in step 619). Thereafter, the timer value T is given a predetermined positive value T1 (in step 621) and the pulse number M is increased by 1 (in step 623) before going to step 647 wherein the stepper motor actuating signals which have been moved by one step in the upshift direction are sent out. Thus, the stepper motor 1110 is rotated one unit in the upshift direction. By repeating the execution of the above mentioned routine, the value M is increased. When the value M has become equal to Mo, the program goes from step 613 to step 651. If, in the step 604 or 606, the shift reference switch 1298 is turned off in the present routine, the program goes directly to the step 651.

If, in step 609, V is less than Von, a vehicle speed data (a complete engagement off vehicle speed Voff) at which the complete engagement of the clutch is to be released are retrieved (in step 625). This retrieval is substantially the same as the retrieval routine 607 for the complete engagement on vehicle speed data Von (except that the stored data are different in the following respects), and thus description thereof is omitted.

Figure 8:
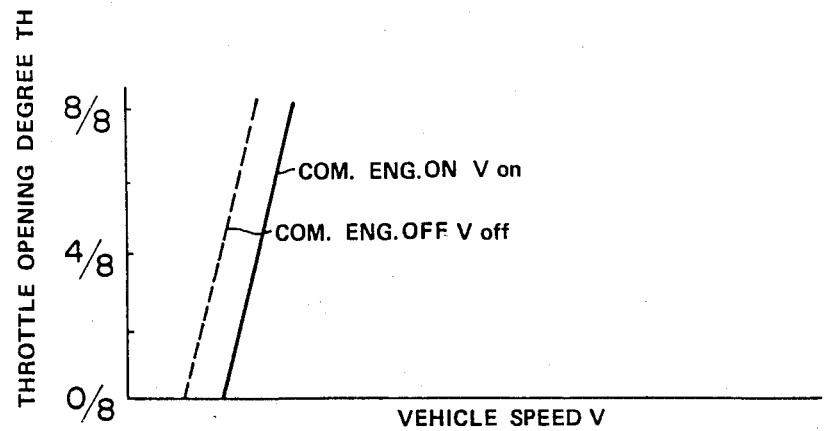
FIG. 8 is a graph showing the relationship between the complete engagement on vehicle speed Von and the complete engagement off vehicle speed Voff.

The complete engagement on vehicle speed data Von and the complete engagement off vehicle speed data Voff have the relation as shown in FIG. 8. The relation that Von is greater than Voff provides a hysterisis. This prevents the occurrence of hunting. Preferably, as shown in FIG. 7, the vehicle speed data Von and Voff increase as the throttle opening degree TH increases.

Returning to FIGS. 5(a) and 5(b), the complete engagement off vehicle speed data Voff that has been retrieved in step 625 is compared with the actual vehicle speed V (in step 627). If the actual vehicle speed V is less than or equal to Voff, the complete engagement flag F is given zero (in step 629) and step 631 is executed. If the actual vehicle speed V is greater than Voff, a determination is made whether the complete engagement flag F is zero or not (in step 633). If F is equal to zero, the program goes to the step 631, while if the F is equal to 1, the program goes to the previously described step 613. In the step 631, a determination is made whether the complete engagement pulse number data M is zero or not. If M is not equal to zero, a determination is made whether the timer value T is less than or equal to zero (in step 635). If the timer value T is positive, the timer value T is decreased by the predetermined value ΔT (in step 637) and the same stepper motor actuating signals as those in the preceding routine are sent out (in step 647) before returning to the START. After repeating the above steps, the timer value T is decreased repeatedly by the predetermined value ΔT so that the timer value T becomes zero or negative upon elapse of a predetermined period of time. When the timer value T has become zero or negative, the stepper motor actuating signals are moved by one step in the downshift direction (in step 641). Then, the timer value T is given the prdetermined positive value T1 (in step 643), the pulse number M is decreased by 1 (in step 645), and then stepper motor actuating signals which have been moved by one step in the downshift direction are sent out (in step 647) before returning to the START. As a result, the stepper motor 1110 is rotated by one unit in the downshift direction. After repeating the above mentioned flow, the value M is gradually decreased and when the value M has become equal to zero, the program goes from the step 631 to the step 651. The value M is set as zero to indicate the position of the stepper motor 1110 when the rod 1182 of the shift operating mechanism 1112 has moved to the leftmost position as viewed in FIG. 2B, i.e., the final or limit position of the overstroke range.

Figure 9:
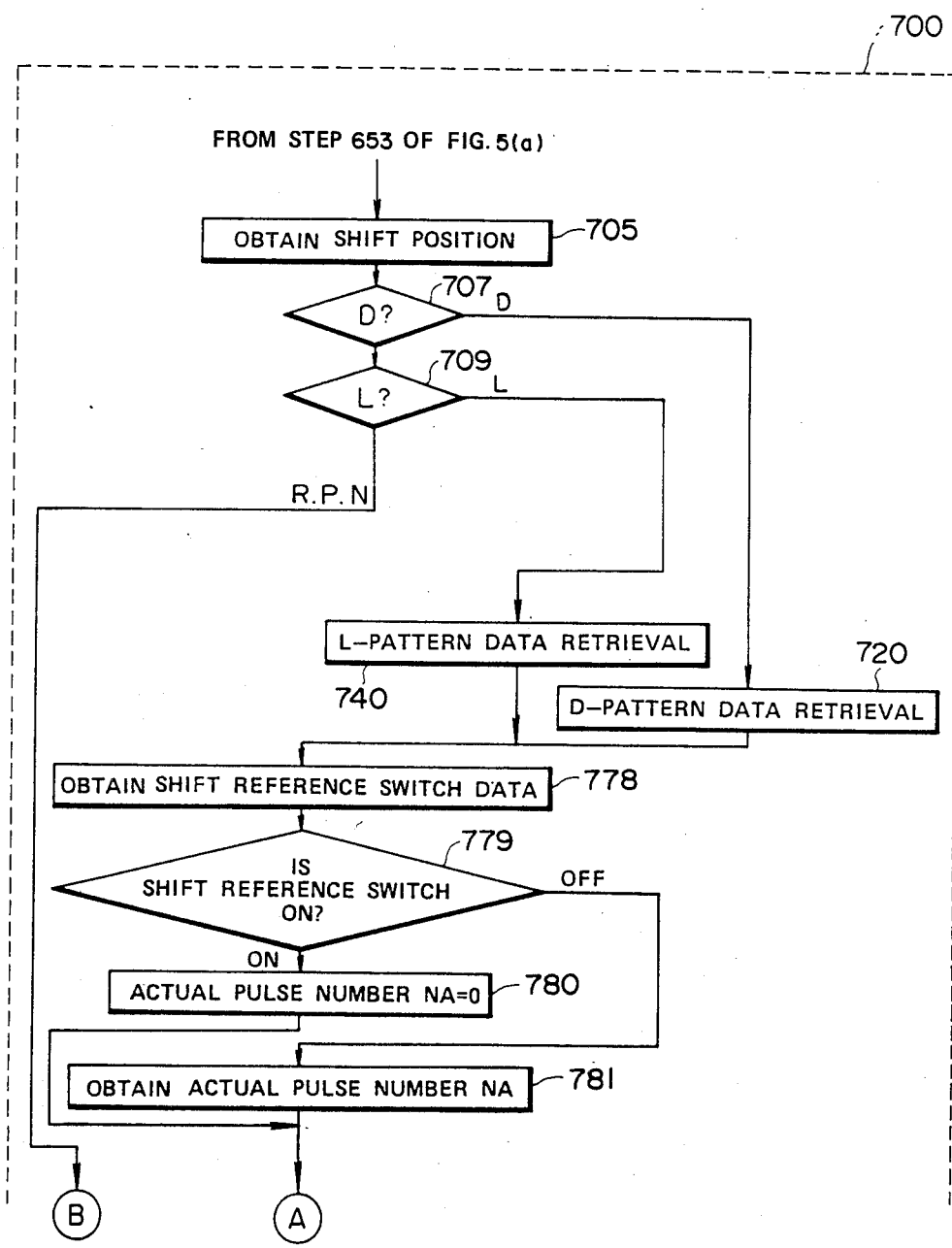
FIGS. 9(a) and 9(b), when combined, illustrate a stepper motor control routine 700.
Figure 9B:
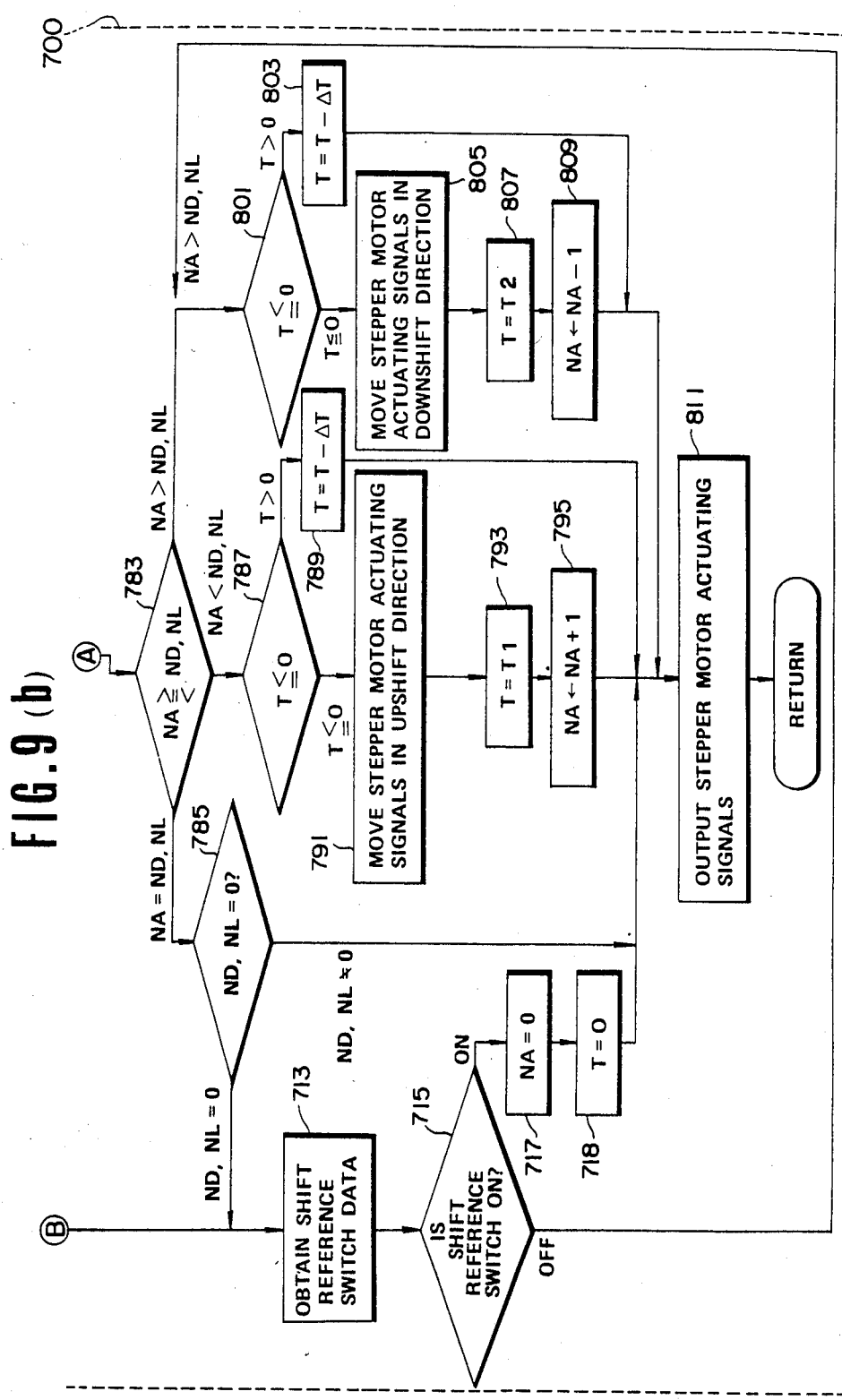
Figure 10:
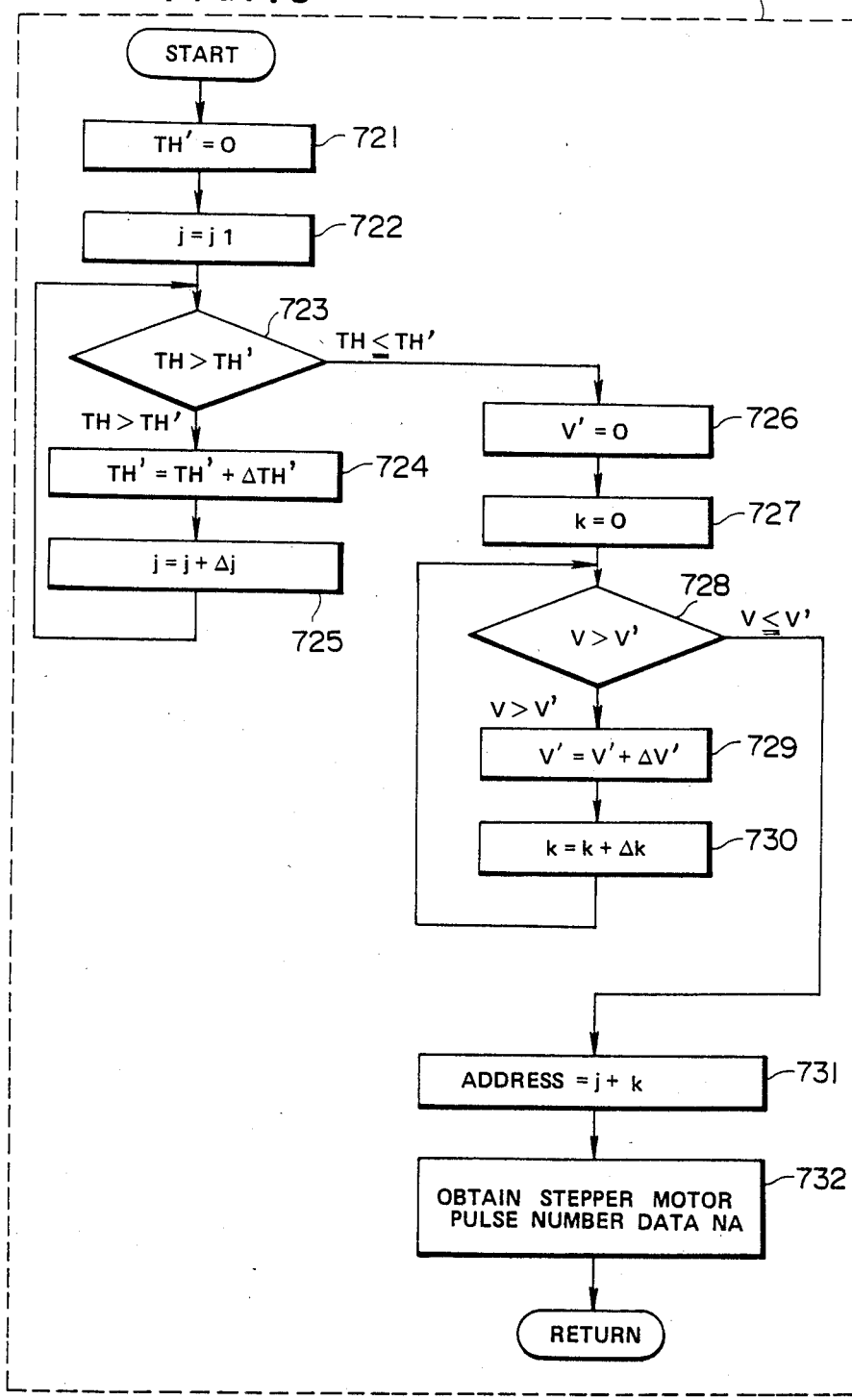
FIG. 10 is a flow chart showing a D-range shift pattern retrieval routine 720.

In step 651, a determination is made whether the complete engagement flag F is equal to 1 or not. If F is equal to 1, a determination is made whether the complete engagement pulse number M is equal to Mo or not (in step 653). If M is not equal to Mo, the program returns to the START, while if M is equal to Mo, the program goes to a step 705 of a stepper motor control routine 700 which is shown in FIGS. 9(a) and 9(b) and described after. This means that the stepper motor control routine 700 is executed only after the clutch has been completely engaged and M is equal to Mo.

Hereinafter, the complete engagement control routine 600 is described in terms of how it acts depending upon the cases it is involved.

In the case the shift reference switch 1298 was turned off in the preceding routine and is turned on in the present routine and a flow along steps 603→604→605→607→609 is executed: The pulse number M is given Mo in step 605. If V is greater than or equal to Von in step 609, the stepper motor 1110 is not rotated. That is, the complete engagement state of the clutch is maintained (a flow along steps 611→613→651). If V is less than Von in step 609, V is compared with Voff in step 627. If V is less than or equal to Voff, the stepper motor 1110 is rotated toward the overstroke range until M becomes equal to zero so as to release the complete engagement of the clutch (a flow along steps 624→627→629→631→635→(637)→641→643→645→647). If V is greater than Voff (i.e., V is greater than Voff and less than Von, i.e., V is disposed within the hysterisis range) and the complete engagement was maintained in the preceding routine, the stepper motor 1110 is rotated until M becomes equal to Mo with the complete engagement maintained (a flow along steps 627→633→613 and onwards). If the complete engagement was not maintained in the preceding routine, the stepper motor 1110 is rotated with the complete engagement released until M becomes equal to zero (a flow along steps 627→633→631 and onwards). Since, as described before, the shift reference switch 1298 is designed to be turned on right before the rod 1182 of the shift operating mechanism 1112 enters into the overstroke range, the rod 1182 is moved to the point where the largest reduction ratio is established during kickdown where the accelerator pedal is depressed rapidly while the vehicle is travelling, thus turning on the shift reference switch 1298. Although in this state the shift reference switch 1298 is turned on, since V is apparently greater than Von, the complete engagement state is maintained.

In the case the shift reference switch 1298 was turned off in the preceding routine and is turned off in the present routine, either (a flow along steps 603→604), the program goes to step 651.

In the case the shift reference switch 1298 was turned on in the preceding routine and is turned on in the present routine, too (a flow along steps 603→606→607): If V is greater than or equal to Von, the stepper motor 1110 is rotated until M increases up to Mo (a flow along steps 609→611→613→615→(617)→619→621→623→647) so as to completely engage the clutch, and the program goes to step 651. If V is less than Voff, V is compared with Voff. If V is less than or equal to Voff, the stepper motor 1110 is rotated until M becomes equal to zero so as to release the complete engagement (a flow along steps 627→629→631→635→(637)→641→643→645→647). If V is greater than Voff in step 627 (i.e., V is greater than Voff and less than Von), the stepper motor 1110 is rotated until M becomes equal to Mo if the complete engagement was maintained in the preceding routine (a flow along steps 627→633→613 and onwards). If the complete engagement was released in the preceding routine the stepper motor 1110 is rotated until M becomes equal to zero (a flow along steps 627→633→631 and onwards). That is, the state in the preceding routine, i.e., the complete engagement maintained or released, is maintained.

In the case the shift reference switch 1298 was turned on in the preceding routine and is turned off in the present routine (a flow along steps 603→606), the program goes to step 651.

The condition under which the program goes from the step 651 to the stepper motor control routine 700 is when M becomes equal to Mo as described before.

Hereinafter, the control routine for the stepper motor 1110 is described. The stepper motor control routine 700 is illustrated in FIGS. 9(a) and 9(b). This stepper motor control routine 700 is executed only when M is equal to Mo in step 653 of the complete engagement control routine 600 (i.e., when the clutch is completely engaged). First, a shift position is obtained from a shift position switch 304 (in step 705). Second, a determination is made whether a shift position is in "D" position or not (in step 707). If the shift position is in "D" position, D range shift pattern retrieval routine is executed (in step 720).

The D range shift pattern data retrieval routine in step 720 provides a desired optimum reduction ratio indicative signal. The desired reduction ratio indicative signal represents a desired optimum reduction ratio for the detected operating condition of the automotive vehicle and is expressed in terms of a number of pulses ND which is hereinafter called as a stepper motor pulse number. The D range shift pattern data retrieval routine is executed in a manner illustrated in FIG. 10. The stepper motor pulse number data ND are stored in the ROM 314 in a matrix shown in FIG. 11. The vehicle speed values are arranged along the lateral axis and the throttle opening degree values are arranged along the vertical axis (the vehicle speed increases toward the right in FIG. 11 and the throttle opening degree increases toward the bottom in FIG. 11). Referring to the D range shift pattern data retrieval routine 720 shown in FIG. 10, a reference throttle opening degree TH' is given zero which corresponds to idle state in step 721 and an address j of the ROM 314 where a stepper motor pulse number data which corresponds to zero throttle opening degree is given a number j1 in step 722. Subsequently, the actual throttle opening degree TH is compared with the reference throttle opening degree TH' in step 723. If the actual throttle opening degree TH is greater than TH', the reference throttle opening degree TH' is increased by a predetermined value ΔTH' in step 724 and the address j is increased by a predetermined value Δj in step 725. After this step, the actual throttle opening degree TH is compared with the reference throttle opening degree TH' again (in step 723), and if the actual throttle opening degree TH stays greater than TH', a flow along the steps 724, 725 and 723 is repeated. After the execution of the flow along the steps 723, 724 and 725 has been repeated, the number j corresponding to the actual throttle opening degree TH is given when the actual throttle opening degree TH becomes equal to or less than the reference throttle opening degree TH'. Subsequently, steps 726, 727, 728, 729 and 730 are executed in relation to vehicle speed V. As a result, the number k is given which corresponds to the actual vehicle speed V. Then, the number k thus given is combined with the number j in step 731, thus producing an address corresponding to a set of the actual throttle opening degree TH and the actual vehicle speed V, and the stepper motor pulse number data ND is obtained from this address in step 732. The pulse number data ND thus obtained shows a desired stepper motor pulse number to be given for the actual throttle opening degree TH and the actual vehicle speed V. The D range shift pattern data retrieval routine 720 ends with the step of retrieving the pulse number data ND before the program returns to START.

Referring to FIG. 9(a), if the "D" range position is not selected as the result of the determination in the step 707, then a determination is made in step 709 whether the "L" range position is selected. If the "L" range position is selected, a L range shift pattern data retrieval routine is executed (in step 740). The L range shift pattern data retrieval routine is substantially similar to the D range shift pattern data retrieval routine 720 except that the stepper motor pulse number data NL are different from the stepper motor pulse number data ND (the difference between the pulse number data ND and NL will be described hereinafter) and are stored at different addresses in the ROM 314. A detailed explanation thereof is, therefore, omitted.

After the data retrieval of the suitable pulse number data ND or NL in the corresponding step 720 or 740, a shift reference switch data is obtained from the shift reference switch 1298 in step 778 and then a determination is made whether the shift reference switch 1298 is in the on-state or the off-state in step 779. The shift reference switch data indicates whether the shift reference switch 1298 is turned on or off. If the shift reference switch 1298 is in the off state, the actual stepper motor pulse number data NA is retrieved from the RAM 315 in step 781. This pulse number data NA corresponds one to one to the actual rotary position of the stepper motor 1110 unless there is any electric noise. If, in the step 779, the shift reference switch 1298 is in on state, the pulse number data NA is given zero in step 780. The shift reference switch 1298 is so designed as to be turned on when the rod 1182 assumes a position corresponding to the largest reduction ratio. This results in that the rotary position of the stepper motor 1110 always corresponds to the largest reduction ratio position whenever the shift reference switch 1298 is turned on. Because the actual pulse number data NA is given zero whenever the shift reference switch 1298 is turned on, the pulse number data NA can correspond accurately to the actual rotary position of the stepper motor 1110 should there occur a signal distortion due to electric noise. Consequently, the signal distortion due to the accumulation of noise is eliminated. Subsequently, in step 783 (see FIG. 9(b)), the actual pulse number data NA is compared with the retrieved desired pulse number data ND or NL.

Referring to FIG. 9(b), if the actual pulse number data NA is equal to the desired pulse number data ND or NL as the result of step 783, a determination is made in step 785 whether the desired pulse number ND or NL is zero. In the case the desired pulse number ND or NL is not zero when the reduction ratio is not the largest, the same stepper motor actuating signals (described hereinafter) as provided for in the preceding routine are sent out in step 811 before the program returns to START. If the desired pulse number ND or NL is zero in the step 785, the shift reference switch data is obtained from the shift reference switch 1298 in step 713, and a determination is made whether the shift reference switch 1298 is in the on state or the off state in step 715. If the shift reference switch 1298 is in the on state, the actual pulse number data NA is given zero in step 717, a stepper motor timer value T which will be described later is given zero in step 718, and then the same stepper motor actuating signals as those of the preceding routine which correspond to the zero pulse number are sent out in step 811. If, in step 715, the shift reference switch 1298 is in the off state, the execution of the steps following the step 801, which will be described later, begins.

If, in the step 783, the actual pulse number NA is less than the desired pulse number ND or NL, the stepper motor 1110 needs to be actuated toward where the pulse number increases. First, a determination is made whether the timer value T is negative inclusive zero in step 787. If the timer value T is positive, then the timer value T is decreased by a predetermined value ΔT in step 789, and then the same stepper motor actuating signals as those of the preceding routine are sent out in step 811 before the program returns to START. This step 789 is repeated until the timer value T becomes zero or negative. When the timer value T becomes zero or negative after elapse of a predetermined period of time, then the stepper motor actuating signals for the stepper motor 1110 are moved in the upshift direction by one stage in step 791 as described later. Then, the timer value T is given a predetermined positive value T1 (which will be described later) in step 793. The stepper motor pulse number NA is increased by 1 in step 795, and the stepper motor actuating signals which have been moved by one stage in the upshift direction are sent out in step 811 before the program returns to START. This causes the stepper motor 1110 to rotate in the upshift direction by one unit.

If, in step 783, the present stepper motor pulse number NA is greater than the desired pulse number ND or NL, a determination is made whether the timer valve T is less than or equal to 0 (zero) or not (in step 801). If the timer value T is positive or greater than zero, the timer value T is decreased by the predetermined value ΔT (in step 803) and the same stepper motor actuating signals as those in the preceding routine are produced (in step 811) before the program returns to START. After repeating this process, since the subtraction of the predetermined value ΔT from the timer value T is repeated, the timer value T becomes 0 (zero) or negative. When the timer value T becomes 0 (zero) or negative, the stepper motor actuating signals are moved in the downshift direction by one step (in step 805). The timer value T is given a predetermined positive value T2 which is smaller than the timer value T1 (in step 807), the predetermined value T2 being described later. The present stepper motor pulse number NA is decreased by 1 (in step 809), and the stepper motor actuating signals having been moved by one step in the downshift direction are produced (in step 811) before the program returns to START. This causes the stepper motor 110 to rotate in the downshift direction by one unit.

Figure 13:
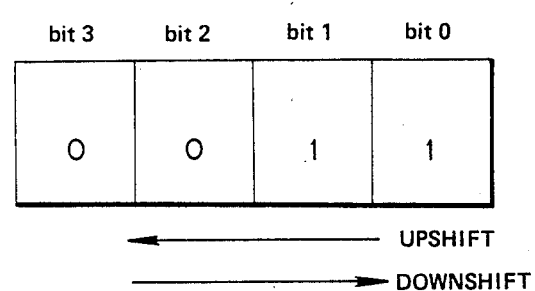
FIG. 13 is a diagrammatic view of the content of four bit positions corresponding to the mode A.

Referring to FIGS. 12 to 14 and particularly to FIGS. 13 and 14, the stepper motor actuating signals will now be described. The stepper motor 1110 is connected with four output lead lines 317a, 317b, 317c, and 317d (see FIG. 3) having thereon respective signals which may vary in four modes A~D, and the stepper motor 1110 rotates in the upshift direction (the direction denoted by an arrow X as shown in FIG. 3 if the actuating signals are moved in the sequence of A→B→C→D→A, and the stepper motor 1110 rotates in the reverse or downshift direction if the actuating signals are moved in the sequence of D→C→B→A→D. Referring to FIG. 13 which illustrates the content of the bits corresponding to the mode A of the actuating signals, the digit "1" is written in bit position 0, the digit "1" in bit position 1, the digit "0" in bit position 2, and the digit "0" in bit position 3. The bit positions 0, 1, 2, 3 correspond to the signals to be applied to the respective leads 317a, 317c, 317b and 317d. If the digit is "1" in a particular bit position, a signal voltage having a high level is applied to the lead operatively associated with the particular bit position. If the digit in a particular bit position is "0", a signal voltage having a low level is applied to the corresponding lead. Consequently, when the stepper motor 1110 is to be rotated in the upshift direction, the bits are rotated to the right, i.e., the digits are moved one place to the left. When the stepper motor 1110 is to be rotated one step in the downshift direction, the bits are rotated to the left, i.e., the digits are moved one place to the right.

Figure 14A:
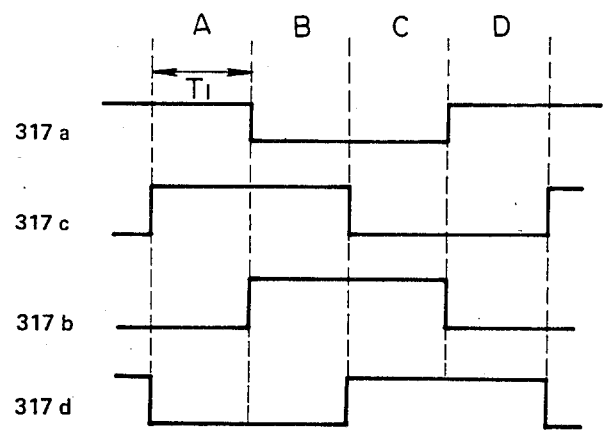
FIG. 14(a) is a timing diagram of the stepper motor actuating signals during upshifting.
Figure 14B:
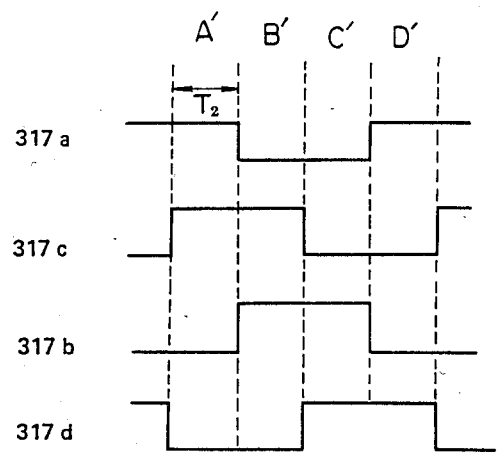
FIG. 14(b) is a timing diagram of the stepper motor actuating signals during downshifting.

The states of the signals on the output leads 317a, 317b, 317c and 317d during upshifting are shown in FIG. 14(a). Referring to this figure, a period of time during which the signals stay in each of states A, B, C and D is given by the timer value T1 which is set in step 793. Therefore, in effecting an upshifting, the stepper motor 1110 is rotated by one unit each time after elapse of the timer value T1. This means that a rotational speed of the stepper motor 110 is proportional to 1/T1. The states of the signals on the output leads 317a, 317b, 317c and 317d during downshifting are shown in FIG. 14(b). In this figure, a period of time during which the signals stay in each of the states A', B', C' and D' is given by the timer value T2 which has been set in step 807. Therefore, in effecting a downshifting, the stepper motor 1110 is rotated by one unit each time after elapse of the timer value T2. This means that the rotational speed of the stepper motor 1110 is proportional to 1/T2. Since, as described above, T1 is greater than T2, the rotational speed of the stepper motor 1110 during downshifting is faster than the rotational speed of the stepper motor 1110 during upshifting. This means that downshifting is effected rapidly as opposed to upshifting which is effected slowly. As a result, a good response characteristic to shifting in downshifting is obtained and the occurrence of substantial shocks is prevented during upshifting.

As described above, the stepper motor actuating signals are moved to the left or in the upshift direction in step 791 when the actual pulse number, i.e., the actual reduction ratio, is smaller than the desired pulse number, i.e., the desired optimum reduction ratio, thus serving as actuating signals for rotating the stepper motor 1110 in the upshift direction. In the reverse case, when the actual reduction ratio is larger than the desired optimum reduction ratio, the stepper motor actuating signals are moved to the right or in the downshift direction in step 805, thus serving as actuating signals for rotating the stepper motor 1110 in the downshift direction. When the actual reduction ratio agrees with the desired optimum reduction ratio, the actuating signals are not moved to the left nor right, and the same actuating signals as those of the preceding routine are sent out. In this case, the stepper motor 1110 will not rotate, thus maintaining the reduction ratio constant.

If, in the previously described step 709 shown in FIG. 9(a), the "L" range position is not selected, i.e., if "R" or "P" or "N" range is selected, the execution of the step 713 and its following steps begins. The shift reference switch data is obtained from the shift reference switch 1298 in step 713 and if the shift reference switch 1298 is in the on state, the actual pulse number NA is given zero in step 717 and the stepper motor timer value T is given zero in step 718. Then, the same actuating signals as those of the preceding routine are sent out in step 811 before the program returns to START. If the shift reference switch 1298 is in the off state, the steps following the step 801 are executed which have been described. That is, the stepper motor 110 is rotated in the downshift direction. Accordingly, the largest reduction ratio is maintained when the shift position is in "R" or "P" or "N".

Hereinafter, a description is made as to how the desired optimum reduction ratio is determined.

Referring to FIGS. 15–19, a description will now be given as to how the desired optimum reduction ratio is determined to satisfy the minimum fuel consumption rate curve during operation in the D range.

Figure 15:
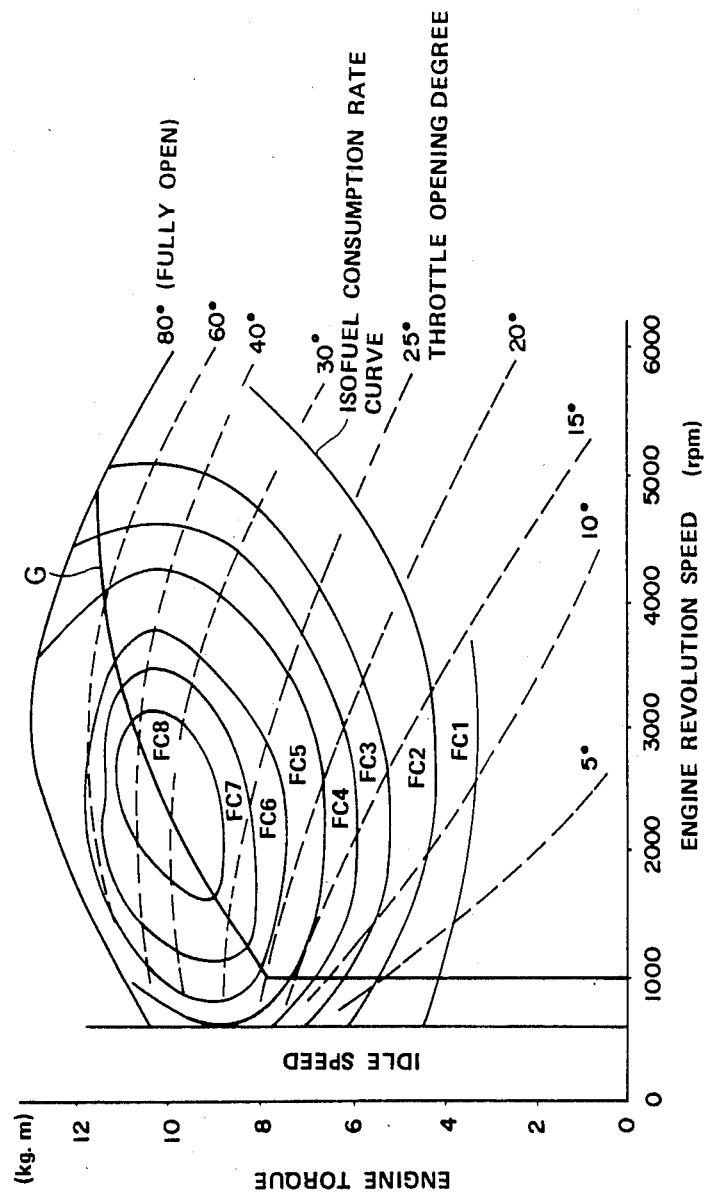
FIG. 15 is a graph showing a minimum fuel consumption rate curve G.
Figure 16:
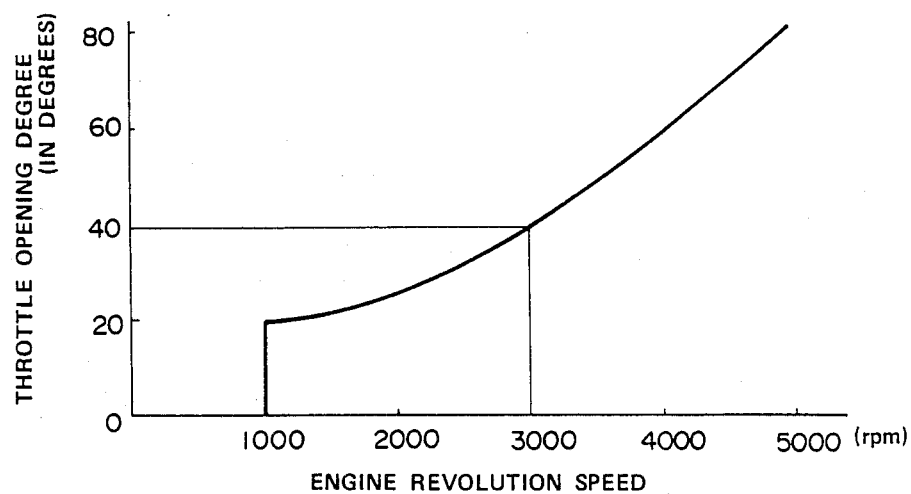
FIG. 16 is a graph showing the minimum fuel consumption rate curve expressed in terms of throttle opening degree and engine revolution speed.
Figure 17:
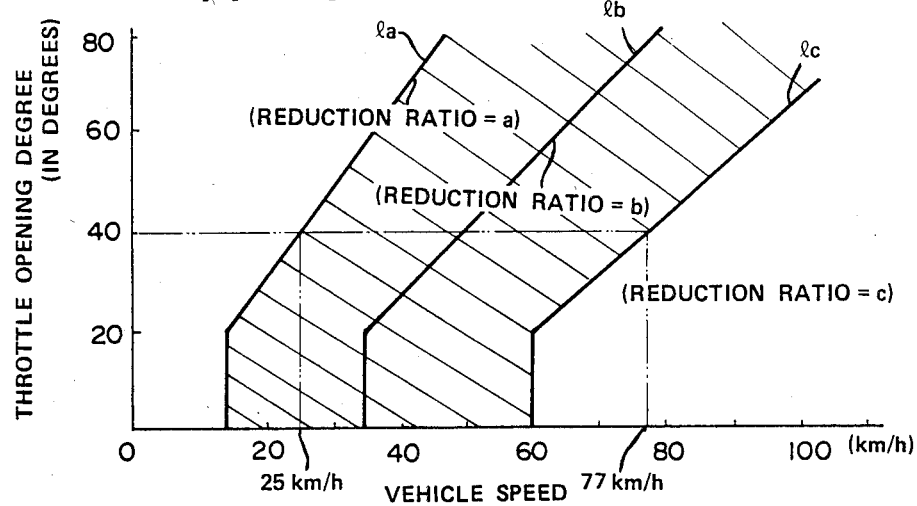
FIG. 17 is a graph showing the relationship shown in FIG. 16 expressed in terms of throttle opening degree and vehicle speed for various reduction ratios.
Figure 18:
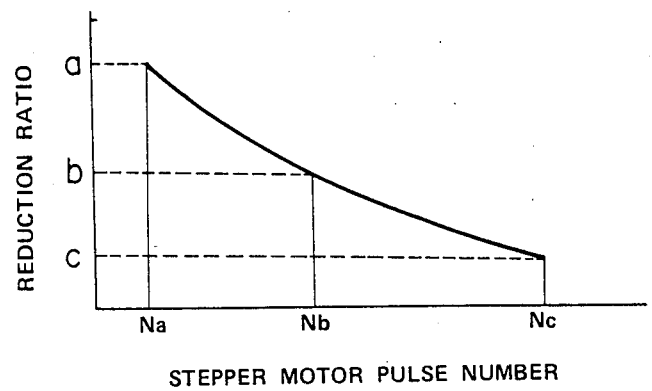
FIG. 18 is a graph showing a predetermined relationship of the reduction ratio with the stepper motor pulse number.
Figure 19:
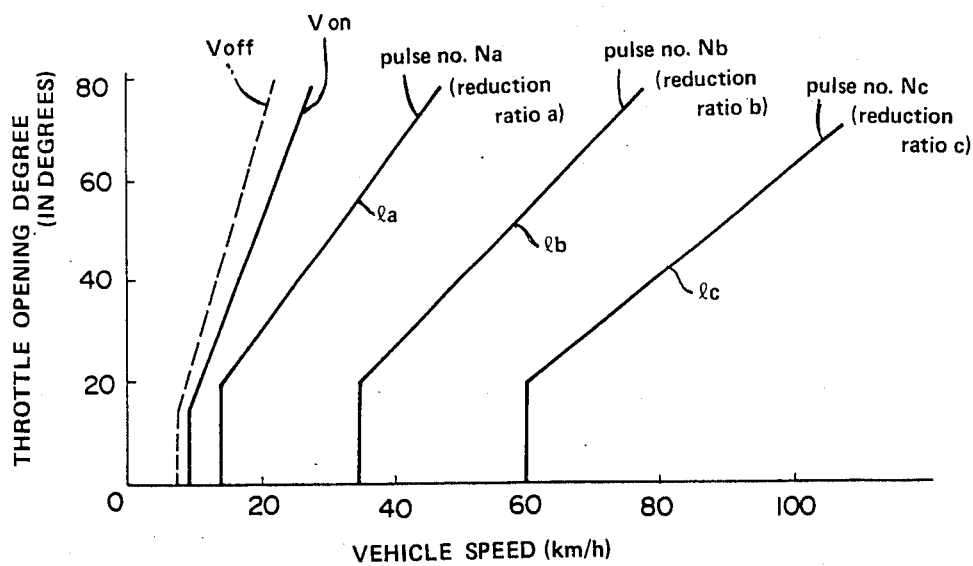
FIG. 19 is a graph showing a predetermined relationship shown in FIG. 16 expressed in terms of throttle opening degree and vehicle speed for various pulse numbers.

Referring to FIG. 15, the engine performance curve is shown. In FIG. 15, engine revolution speed is expressed on the axis of abscissas and engine torque on the axis of ordinates and there are shown engine torque vs., engine revolution speed characteristic curves, each for a throttle opening degree (each curve being accompanied by a throttle opening degree) and there are also shown isofuel consumption rate curves FC1~FC8 (fuel consumption rate reducing in this numerical order). In FIG. 15, the minimum fuel consumption rate curve is denoted by the character G and the most efficient operational state is obtained if the engine is operated on this curve G. In order to control the continuously variable transmission so as to operate the engine along the minimum fuel consumption rate curve G, the pulse number data ND for the stepper motor 1110 are determined in the following manner. If the minimum fuel consumption rate curve G is expressed in terms of throttle opening degree and engine revolution speed, the result may be expressed in FIG. 16. As will be understood, a single engine revolution speed is given for any throttle opening degree. For example, the engine revolution speed 3000 rpm is given for the throttle opening degree 40°. As shown in FIG. 16, the minimum engine revolution speed 1000 rpm is given for low throttle opening degrees (smaller than about 20 degrees) since the drive system of the continuously variable transmission would exhibit resonance with the engine vibration if the clutch 1004 or 1024 is completely engaged with the engine revolution speeds below this minimum engine revolution speed. Assuming engine revolution speed is N and vehicle speed V, then the reduction ratio S is given by the equation:

$$S = (N/V) \cdot k$$

where, k denotes a constant determined by the final reduction ratio and the radius of the tire. It will now be understood from the above equation and FIG. 16 that the desired optimum reduction ratio is determined by the vehicle speed V and the engine revolution speed N which satisfies a predetermined relation with the throttle opening degrees, i.e., engine load, as shown in FIG. 16. If the relation shown in FIG. 16 is expressed in terms of vehicle speed rather than the engine revolution speed, the result may be expressed as shown in FIG. 17. Even with the same engine revolution speed, the vehicle speed differs from reduction ratio to reduction ratio and this fact is expressed in terms of a range of vehicle speed as shown in FIG. 17. Line la denotes the variation upon selecting the largest reduction ratio (reduction ratio a), and line lc denotes the variation upon selecting the smallest reduction ratio (reduction ratio c), and line lb denotes the variation upon selecting an intermediate reduction ratio b. For example, the vehicle can run at vehicle speeds from 25 km/h to 77 km/h with the throttle opening degree being 40 degrees while the reduction ratio decreases. The reduction ratio remains at a below 25 km/h and at c above 77 km/h with the throttle opening degree being 40 degrees. A predetermined relation exists between the position of the rod 1182 of the shift operating mechanism 1112 and the reduction ratio. This means that a predetermined relation exists between the stepper motor pulse number applied to the stepper motor 1110 (i.e., rotary position of the stepper motor 1110) and the reduction ratio as shown in FIG. 18. Thus, the reduction ratios (a or b or c) shown in FIG. 17 can be converted into respective pulse numbers using the graph shown in FIG. 18. The result of this conversion is illustrated in FIG. 19. Also shown in FIG. 19 are complete engagement on Von and off Voff vehicle speed lines shown in FIG. 8 from which it will be understood that the complete engagement on and off vehicle speeds Von and Voff are disposed on the lower vehicle speed side of line la with the largest reduction ratio a.

Control of the continuously variable transmission along the shift pattern illustrated in FIG. 19 is as follows. Before starting the vehicle, the continuously variable transmission is maintained at the largest reduction ratio by the maximum reduction ratio maintaining valve 1120. As the engine revolution speed increases, the forward clutch 1004 is gradually engaged and, when the vehicle speed exceeds the complete engagement on vehicle speed Von line, the forward clutch 1004 is completely engaged. When the vehicle speed increases further and exceeds the line la, the reduction ratio continuously varies between the reduction ratio a and the reduction ratio c in such a manner as to satisfy the relation denoted by the minimum fuel consumption rate curve G shown in FIG. 15. For example, if the throttle opening degree is increased from a state where the vehicle is running at a constant vehicle speed with a constant throttle opening degree in an operating range falling between lines la and lc, the desired engine revolution speed changes and the desired pulse number changes with the change in the desired revolution speed as determined by the relation illustrated in FIG. 16. The stepper motor 1110 rotates to a new rotary position in response to the new desired stepper motor pulse number, establishing a new reduction ratio, thus allowing the actual engine revolution speed to agree with the new desired engine revolution speed. The engine is controlled to operate along the minimum fuel consumption rate curve G of the engine since, as described before, the stepper motor pulse number is determined to satisfy the minimum fuel consumption rate curve G of the engine. In this manner, the reduction ratio is controlled by controlling the stepper motor pulse number since each reduction ratio corresponds uniquely to a single stepper motor pulse number.

From the description above, it will be understood that the desired optimum reduction ratio is determined by the vehicle speed and the desired engine revolution speed which satisfies the predetermined relation with the engine load.

Figure 20:
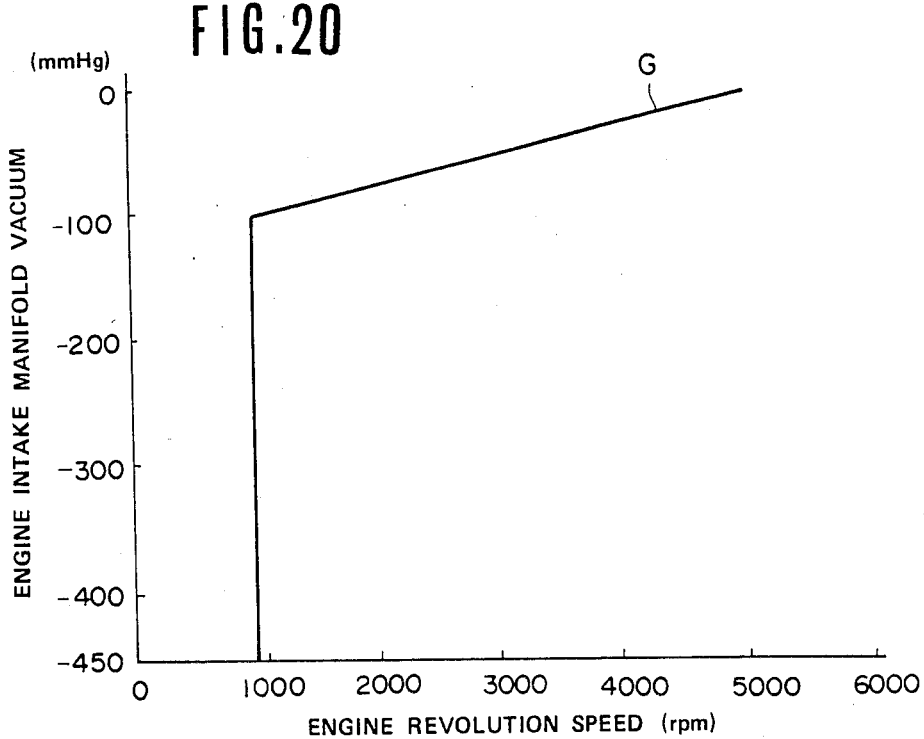
FIG. 20 is a graph showing the minimum fuel consumption rate curve expressed in terms of intake manifold vacuum and engine revolution speed.
Figure 21:
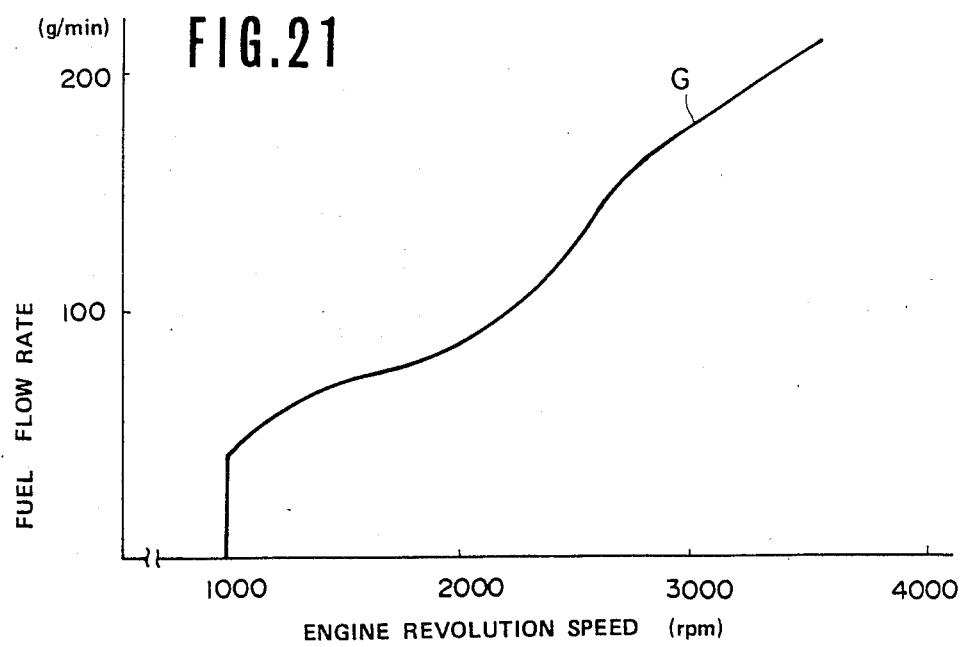
FIG. 21 is a graph showing the minimum fuel consumption rate curve expressed in terms of fuel flow rate.

In the embodiment described above, the control is based on the engine throttle opening degree, but it is also possible to carry out a similar control based on the intake manifold vacuum or the fuel flow rate. FIGS. 20 and 21 illustrate the minimum fuel consumption rate curves G for the latter two cases, respectively.

The above description has focused mainly on the shift pattern to be followed upon selecting the "D" range position, but all that is necessary for operation in the "L" range position is to give data relating to different shift patterns from those for "D" range. For example, for the same throttle opening degree, a shift pattern for the "L" range is designed to give a larger reduction ratio as compared to the reduction ratio which is given by the shift pattern for the "D" range for the purpose of enhancing acceleration performance and ensuring adequate engine braking performance at zero throttle opening degree. In a shift pattern for the "L" range, a reduction ratio larger than the reduction ratio given by the shift pattern for the "D" range is given for the same throttle opening degree. These shift patterns can be accomplished simply by inputting appropriate predetermined pulse data. A more detailed explanation of the operation in the "L" range is omitted since the basic actions carried out to effect the control are the same as in the "D" range.

Next, a brief explanation will be given as to the engine coolant temperature sensor 306 and the brake sensor 307.

The engine coolant temperature sensor 306 is switched "on" when the engine coolant temperature is below a predetermined value (for example, 60° C.). When the engine coolant temperature sensor 306 is in the "on" state, the shift pattern for the "D" range is switched in response to this signal to a shift pattern having larger reduction ratios. This eliminates irregular running of the engine and engine power shortage which otherwise would take place upon start-up of a cold engine.

The brake sensor 307 is switched "on" when the foot brake is actuated. If the brake sensor 307 is in the "on" state and at the same time the throttle opening degree is zero, the shift pattern for the "D" range is switched to a shift pattern giving larger reduction ratios. This ensures strong engine braking upon depressing the foot brake when operating in the "D" range.

Figure 22A:
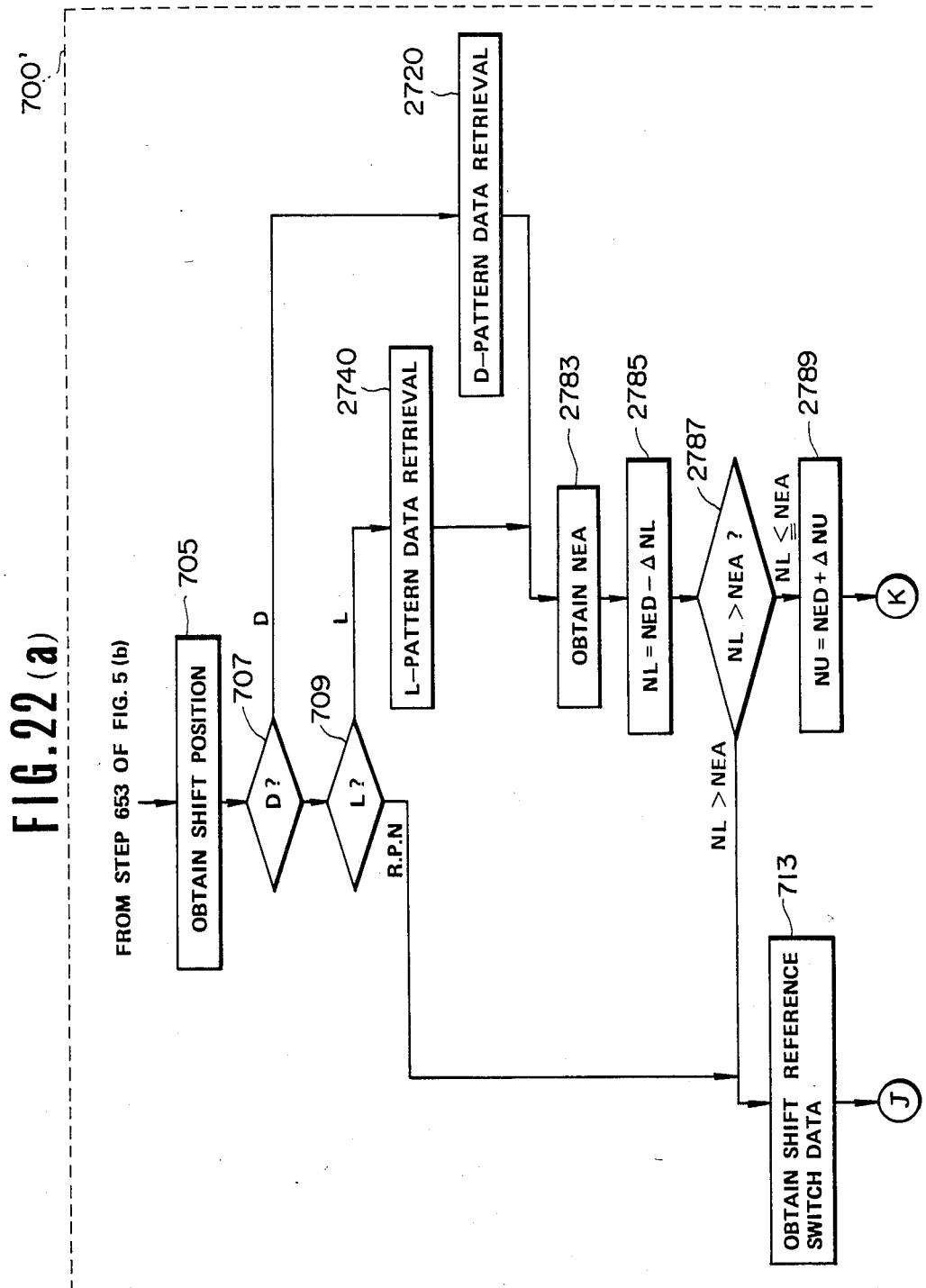
FIGS. 22(a) and 22(b) are similar views to FIGS. 9(a) and 9(b), respectively, and illustrate a second embodiment.
Figure 22B:
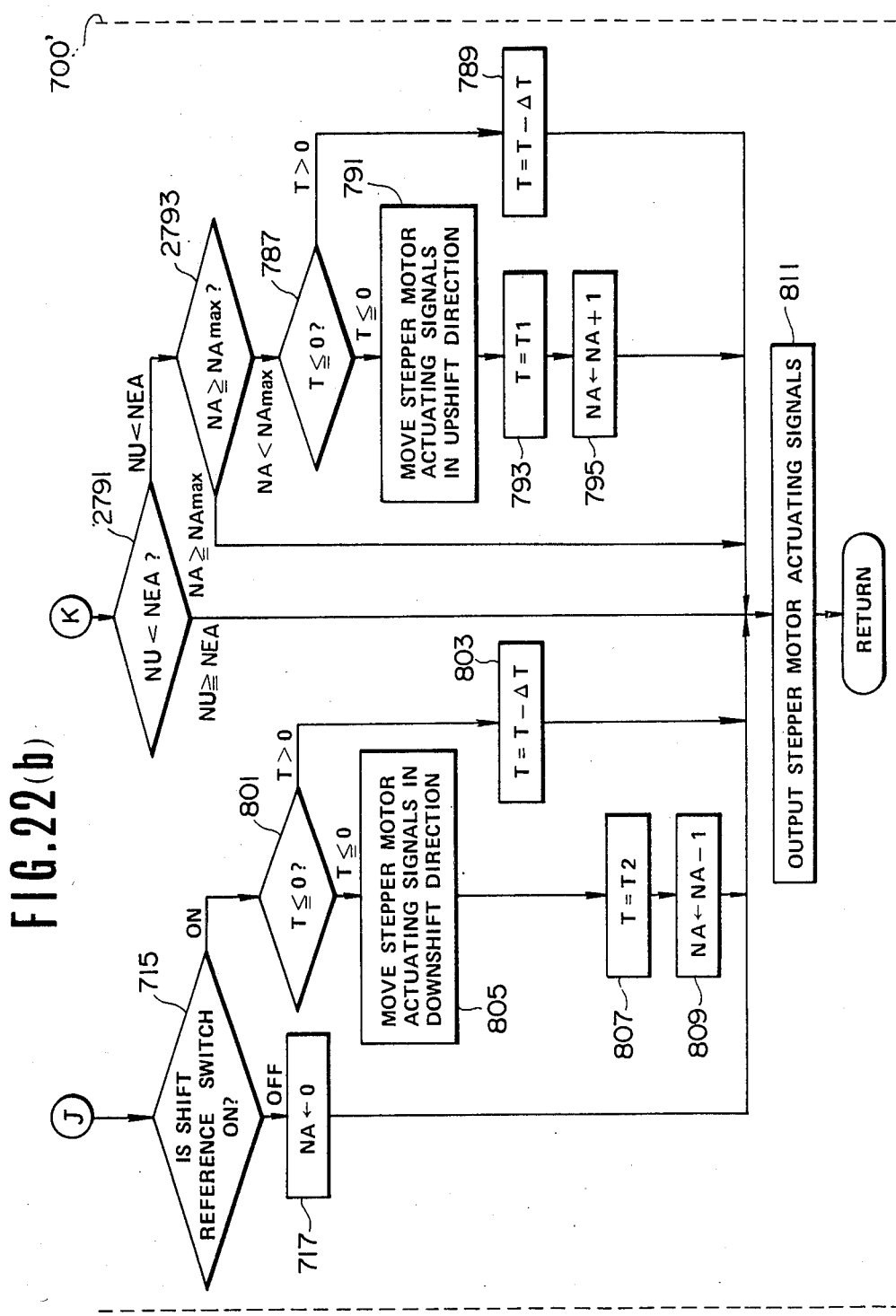

Hereinafter, a second embodiment shown in FIGS. 22(a) and 22(b) is described. This embodiment features in that a direction in which a reduction ratio changes is determined after comparing an actual engine revolution speed with a desired engine revolution speed and provides the similar operation and effect as those provided by the first embodiment.

As compared to the first embodiment, the proccess down to a step 2720 of retrieving D range shift pattern or a step 2740 of retrieving L range shift pattern is similar to that in the first embodiment (the same reference numerals are used herein to designate similar steps to those shown in FIGS. 9(a) and 9(b)). However, as different from the first embodiment, desired engine speed data NED are stored at appropriate addresses in a ROM 314. (The reference character NED is used to represent data to be retrieved during D range and data to be retrieved during L range although the latter two data are different from each other.) (In the case of the first embodiment, desired pluse numbers were stored.) An actual engine revolution speed NEA is obtained from an engine revolution speed sensor 301 (in step 2783), a predetermined revolution speed value ΔNL is subtracted from the desired engine revolution speed NED to provide a desired engine revolution speed lower limit value NL (in step 2785). A comparison is made whether the actual engine revolution speed NEA is less than the engine revolution speed lower limit value NL (in step 2787), and if NEA is less than NL, the program goes to step 713, while, if NEA is greater than or equal to NL, the program goes to step 2789. After the program has proceeded from step 713 along steps 715→801→805 so as to move the stepper motor actuating signals in the downshift direction, the timer T is given T2 (in step 807), and the stepper motor pulse number NA is decreased by 1 (in step 809). Owing to this, the stepper motor is actuated by one unit each time after elapse of the period of time T2.

If the program proceeds from step 2787 to step 2789, a desired engine revolution speed NED is increased by a small revolution speed value ΔNU to provide a desired engine revolution speed upper limit value nu (in step 2789). A determination is made whether this value nu is less than NEA (in step 2791). If nu is less than NEA, the program proceeds to steps beginning with step 2793 where the stepper motor 1110 is rotated in the upshift direction. (However, if the stepper motor 1110 is in its largest (maximum) rotational position where NA is greater or equal to NAmax, the stepper motor 1110 will not be rotated.) In this case, the stepper motor 1110 is rotated by one unit after elapse of a period of time T1. With the above mentioned control, the actual engine revolution speed NEA is controlled to have a value disposed between the desired engine revolution speed upper limit value nu and the desired engine revolution speed lower limit value NL (i.e., NL≦NEA≦nu). Like in the first embodiment, T1 is set greater than T2, the revolution speed of the stepper motor in the upshift direction is slow as compared to the rotational speed of the stepper motor in the upshift direction, with the result of same effect as that provided by the first embodiment.

Figure 23A:
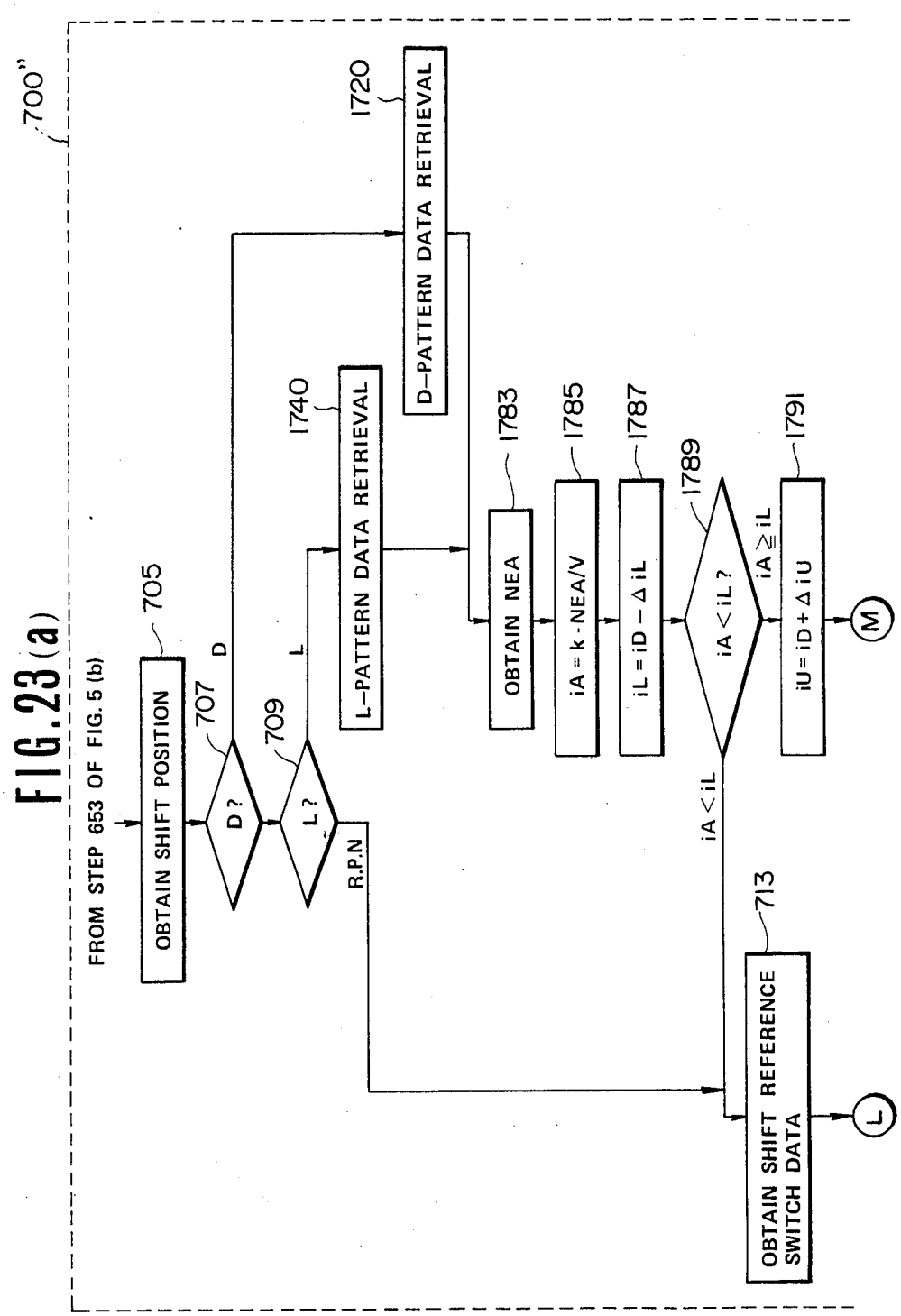
FIGS. 23(a) and 23(b) are similar views to FIGS. 9(a) and 9(b), respectively, and illustrate a third embodiment.
Figure 23B:
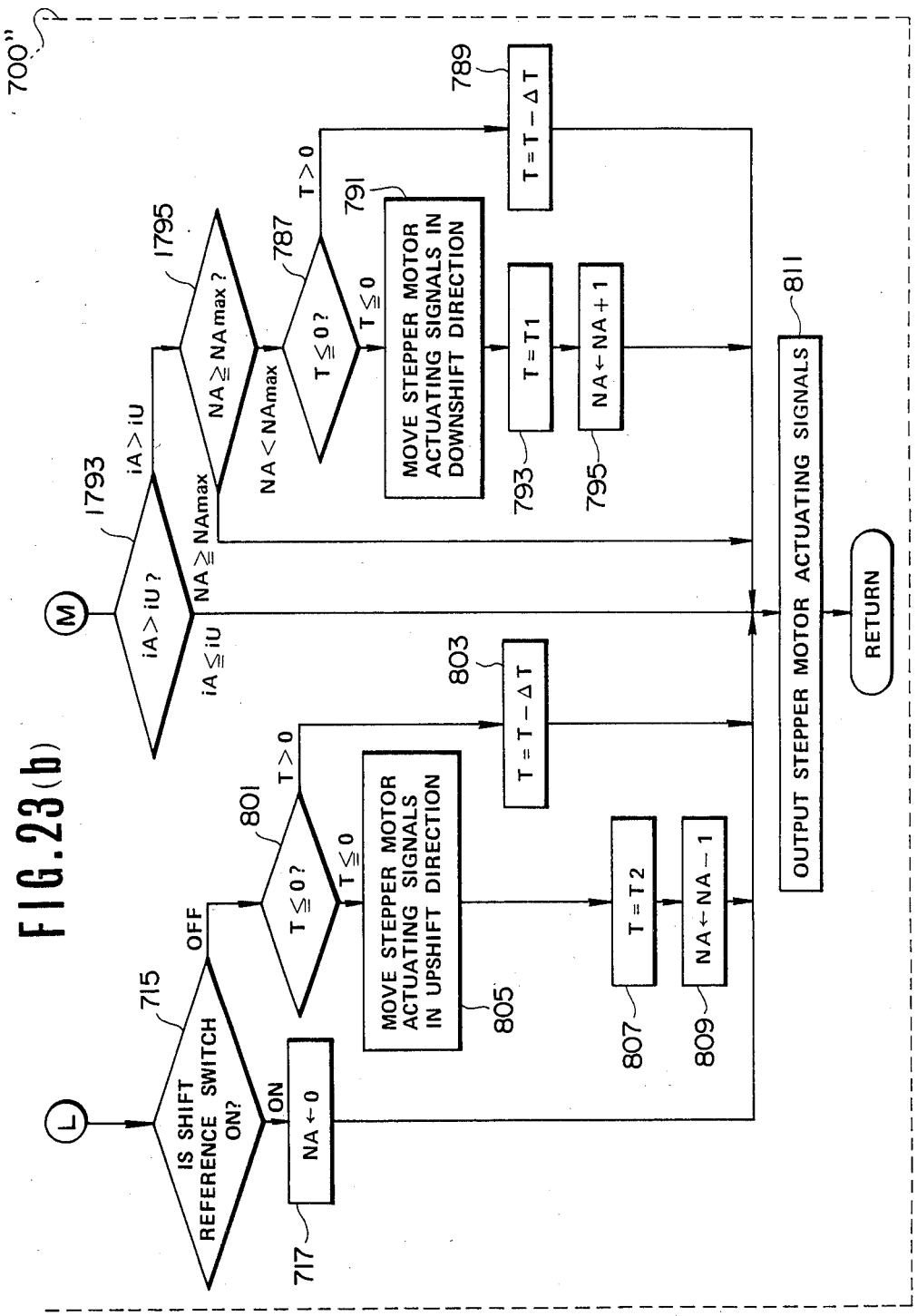

Referring to FIG. 23(a) and FIG. 23(b), a third embodiment according to the present invention is described. This embodiment features in that a direction in which a reduction ratio changes is determined after comparing an actual reduction ratio with a desired reduction ratio and provides the similar operation and effect to those provided by the first embodiment.

As compared to the first embodiment, the process down to a step 1720 of retrieving D range shift pattern or a step 1740 of L range shift pattern in steps 1720 and 1740, respectively, is similar to the process in the first embodiment (the same reference numerals are used herein to designate similar steps to those shown in FIGS. 9(a) and 9(b)). However, as different from the first embodiment, there are stored in a ROM 314 desired reduction ratio iD at appropriate addresses (the reference character iD is used to represent data to be retrieved during D range and data to be retrieved during L range although the latter two data are different from each other.). (In the case of the first embodiment, desired pluse numbers were stored.) An actual engine revolution speed NEA is obtained from an engine revolution speed sensor 301 (in step 1783) and using this NEA, the actual reduction ratio iA is given by calculating an equation $iA = k \cdot NEA/V$ (in step 1785). In this equation, k is an effective diameter which is a constant determined by a final reduction ratio and etc. A desired reduction ratio lower limit value iL is given by decreasing the desired reduction ratio iD by a small reduction ratio $\Delta iL$ (in step 1787), and a determination is made whether iA is less than the desired reduction ratio lower limit value iL or not (in step 1789). If iA is less than iL, the program goes to step 713, while, if iA is greater than or equal to iL, the program goes to step 1791. After the program has proceeded from step 713 along steps 715→801→805 where the stepper motor actuating signals have been moved in the downshift direction, the timer T is given T2 (in step 807), and stepper motor pulse number Na is decreased by one (in step 809) and the stepper motor actuating signals are produced (in step 811). As a result, the stepper motor 1110 is actuated by one unit each time after elapse of the period of time T2.

If the program proceeds from step 1789 to 1791, a desired reduction ratio upper limit value iU is given by decreasing the desired reduction ratio iD by a predetermined small reduction ratio value $\Delta iU$ (in step 1791). A determination is made whether the upper limit value iU is less than the actual reduction ratio iA or not (in step 1793). If iA is greater than iU, the steps beginning with step 1795 are executed so as to rotate the stepper motor in the upshift direction. (If, however, the stepper motor 1110 is rotated to the largest (maximum) reduction ratio position where NA is greater than or equal to NAmax in step 1795, the stepper motor 1110 will not be rotated further.) In this case, the stepper motor 1110 is actuated by one unit each time after elapse of a period of time T1. Owing to the control as above, the actual reduction ratio iA is controlled to be a value between the desired reduction ratio upper limit value iu and the lower limit value iL (i.e., $iL \leq iA \leq iU$). Since the timers T1 and T2 are set such that T1 is greater than T2, the rotational speed of the stepper motor 1110 in the downshift direction is slow as compared to the rotational direction of the stepper motor 1110 in the upshift direction, thus providing the similar effect to that provided by the first embodiment.

As explained above, according to the present invention, in a method of controlling a continuously variable transmission wherein a reduction ratio is continuously variable in response to the operation of a shift actuator, a speed at which the shift actuator operates in effecting a shifting toward a small reduction ratio is slow as compared to a speed at which the shift actuator operates in effecting toward a large reduction ratio, the shifting in the upshift direction is gradually effected, so that a change in engine revolution speed during the shifting is gradual, the torque variation is small and thus shocks during the shifting are suppressed. That is, there is provided a good response characteristic to shifting in the downshift direction as well as a smooth shifting during shifting in the upshift direction.

We claim:

1. A method of controlling change in reduction ratio in a continuously variable transmission of a motor vehicle, wherein the rate of change in reduction ratio in the continuously variable transmission with respect to time is adjustable by a shift actuator in response to a speed at which the shift actuator operates, the method comprising the steps of:
   detecting operating conditions of the motor vehicle;
   determining a desired optimum reduction ratio indicative signal indicative of a target operating position of the shift actuator which corresponds to a desired optimum reduction ratio for the detected operating conditions of the motor vehicle;
   generating an actual reduction ratio indicative signal indicative of an actual operating position of the shift actuator;
   comparing said actual signal with said desired signal and generating a first signal when an upshift is required and a second signal when a downshift is required;
   causing the shift actuator to operate at a first predetermined speed in a first direction in response to the presence of said first signal; and
   causing the shift actuator to operate at a second predetermined speed in a second direction which is opposite to the first direction in response to the presence of said second signal;
   said first predetermined speed being slower than said second predetermined speed.

2. A method of controlling a continuously variable transmission comprising a shift actuator which is rotatable in a first direction in effecting a shifting toward a small reduction ratio and in a second direction which is opposite to the first direction in effecting a shifting toward a large reduction ratio, the method comprising the steps of:
   determining whether a reduction ratio should change toward a small reduction ratio or toward a large reduction ratio;
   operating the shift actuator in the first direction at a first predetermined speed in effecting a shifting toward the small reduction ratio when the reduction ratio should change toward the small reduction ratio;
   operating the shift actuator in the second direction at a second predetermined speed in effecting a shifting toward the large reduction ratio when the reduction ratio should change toward the large reduction ratio,
   said first predetermined speed being slower than the second predetermined speed.

3. A method as claimed in claim 2, wherein said determining step includes a step of comparing a signal indicative of an actual operating position assumed by the shift actuator with a signal indicative of a desired operating position to be assumed by the shift actuator.

4. A method as claimed in claim 2, wherein said determining step includes a step of comparing a signal indicative of an actual engine revolution speed with a signal indicative of a desired engine revolution speed.

5. A method as claimed in claim 2, wherein said determining step includes a step of comparing a signal indicative of an actual reduction ratio with a signal indicative of a desired reduction ratio.

6. A method of controlling change in reduction ratio in a continuously variable transmission of a motor vehicle, the continuously variable transmission having a V-belt running over a drive pulley and a driven pulley, a shift actuator having a plurality of operating positions, a source of hydraulic fluid pressure, means actuated by the shift actuator for regulating fluid supply to and fluid discharge from at least one of the drive pulley and driven pulley so as to establish a reduction ratio that is predetermined for one of the plurality of operating positions of the shift actuator, said method comprising the steps of:

detecting operating conditions of the motor vehicle;

generating a desired operating position of the shift actuator for the operating condition of the motor vehicle detected;

generating a parameter that is set to a predetermined value whenever the continuously variable transmission attains only a single predetermined condition;

comparing said parameter with said desired operating position and generating a first signal when said parameter is to be varied in a first direction and a second signal when said parameter is to be varied in a second direction that is opposite to said first direction;

varying said parameter at a first predetermined speed in said first direction in response to the presence of said first signal, but at a second predetermined speed in said second direction which is opposite to said first predetermined direction; and causing the shift actuator to operate in an open loop manner in response to a variation in said parameter.

7. A method of controlling change in reduction ratio in a continuously variable transmission of a motor vehicle, the continuously variable transmission having a V-belt running over a drive pulley and a driven pulley, a stepper motor having a plurality of rotary positions, a source of hydraulic fluid pressure, means actuated by said stepper motor for regulating fluid supply to and fluid discharge from at least one of the drive and driven pulleys so as to establish a reduction ratio that is predetermined from one of the plurality of rotary positions of the stepper motor, said method comprising the steps of:

detecting operating conditions of the motor vehicle;

generating a desired pulse number indicative of a desired rotary position of said stepper motor for the operating condition of the motor vehicle detected;

generating an actual pulse number that is set to a predetermined value whenever the continuously variable transmission attains a predetermined condition;

comparing said actual pulse number with said desired pulse number and generating a first signal when said actual pulse number is less than said desired pulse number and a second signal when said actual pulse number is greater than said desired pulse number;

varying said actual pulse number at a first predetermined speed in a first direction in response to the presence of said first signal, but at a second predetermined speed in a second direction which is opposite to said first direction in response to the presence of said second signal; and causing the stepper motor to rotate in an open loop manner in response to a variation in said actual pulse number.

* * * * *